(12) United States Patent
Ino et al.

(10) Patent No.: US 8,428,494 B2
(45) Date of Patent: Apr. 23, 2013

(54) DRIVING DEVICE AND IMAGE FORMING APPARATUS

(75) Inventors: Kazushi Ino, Suntou-gun (JP); Tomoo Nagaoka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 165 days.

(21) Appl. No.: 12/837,949

(22) Filed: Jul. 16, 2010

(65) Prior Publication Data
US 2011/0026971 A1    Feb. 3, 2011

(30) Foreign Application Priority Data

Jul. 30, 2009  (JP) ................................ 2009-178080
Oct. 6, 2009   (JP) ................................ 2009-232728
Jul. 8, 2010   (JP) ................................ 2010-156010

(51) Int. Cl.
*G03G 15/06* (2006.01)
(52) U.S. Cl.
USPC .......................... 399/222; 399/393; 74/411.5
(58) Field of Classification Search ................... 399/222, 399/393; 74/411.5
See application file for complete search history.

(56) References Cited

U.S. PATENT DOCUMENTS

2007/0140768 A1* 6/2007 Yoshida ........................ 399/388
2008/0286011 A1* 11/2008 Aoki et al. .................... 399/227

FOREIGN PATENT DOCUMENTS

| CN | 1987671 A | 6/2007 |
|---|---|---|
| CN | 101308344 A | 11/2008 |
| JP | 2001-141022 A | 5/2001 |
| JP | 2005-83487 A | 3/2005 |

OTHER PUBLICATIONS

Office Action mailed Nov. 15, 2012, in Korean Application No. 10-2010-0073406.
Notification of the First Office Action dated Jan. 14, 2013, in Chinese Application No. 201010243547.6.

\* cited by examiner

*Primary Examiner* — Ryan Walsh
(74) *Attorney, Agent, or Firm* — Fitzpatrick, Cella, Harper & Scinto

(57) ABSTRACT

A driving device to be used in an image forming apparatus includes an input gear; a partly non-toothed gear having a toothed portion engageable with the input gear and having a non-toothed portion; a holding member capable of placing the partly non-toothed gear in a holding state in which the non-toothed portion opposes the input gear and the partly non-toothed gear is not engaged with the input gear and capable of placing the partly non-toothed gear in a released state in which the holding state is released; a cylindrical member rotatable by receiving a rotational force; and an entering portion which is rotatable together with the partly non-toothed gear and which is capable of entering an inside of the cylindrical member and capable of receiving the rotational force from the cylindrical member by a frictional force between the entering portion and the cylindrical member.

12 Claims, 22 Drawing Sheets

(A)

(B)

(A)

(B)

(A)

(B)

(A)

(B)

(A)

(B)

DRIVING DEVICE AND IMAGE FORMING APPARATUS

FIELD OF THE INVENTION AND RELATED ART

The present invention relates to an image forming apparatus and a driving device used in the image forming apparatus.

As the driving device used in the image forming apparatus, a driving device as described in Japanese Laid-Open Patent Application 2001-141022 has been conventionally known.

That is, the driving device is constituted by a partly non-toothed gear provided with a non-toothed portion which is not engaged with an input gear, a spring for rotating and urging the partly non-toothed gear in one direction, and a solenoid engaged with the partly non-toothed gear in order to stop the partly non-toothed gear at a position in which the partly non-toothed gear is not engaged with the input gear.

Further, by releasing the engagement of the solenoid, the partly non-toothed gear is rotated by an urging force of the spring. Then, the partly non-toothed gear engages with the input gear, so that a driving force is transmitted to the partly non-toothed gear.

However, a rotational speed of the input gear rotated by being rotated and urged by the spring does not coincide with the rotational speed of the input gear in some cases. As a result, there has arisen such a problem that a first engaging tooth of a toothed portion of the partly non-toothed gear and a tooth of the input gear hit against each other to make a loud impact noise, by an impact at the time of the engagement, every connection of a clutch.

SUMMARY OF THE INVENTION

A principal object of the present invention is to provide a rotation control clutch capable of alleviating an engaging impact between a partly non-toothed gear and an input gear during driving force transmission and to provide an image forming apparatus.

According to an aspect of the present invention, there is provided a driving device to be used in an image forming apparatus, comprising:

an input gear;

a partly non-toothed gear having a toothed portion engageable with the input gear and having a non-toothed portion;

a holding member capable of placing the partly non-toothed gear in a holding state in which the non-toothed portion opposes the input gear and the partly non-toothed gear is not engaged with the input gear and capable of placing the partly non-toothed gear in a released state in which the holding state is released;

a cylindrical member rotatable by receiving a rotational force; and an entering portion which is rotatable together with the partly non-toothed gear and which is capable of entering an inside of the cylindrical member and capable of receiving the rotational force from the cylindrical member by a frictional force between the entering portion and the cylindrical member.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 18(A) and 18(B) are schematic views of a rotation control clutch in Embodiment 4, wherein FIG. 18(A) is a perspective view and FIG. 18(B) is a side view.

DESCRIPTION OF THE PREFERRED EMBODIMENTS

Embodiment 1

In this embodiment, the present invention is applied to a rotation control clutch which is a driving device for a developing rotary 1 in an image forming apparatus 29. The image forming apparatus 29 operates in the following manner.

[Image Forming Apparatus]

Figure 1:
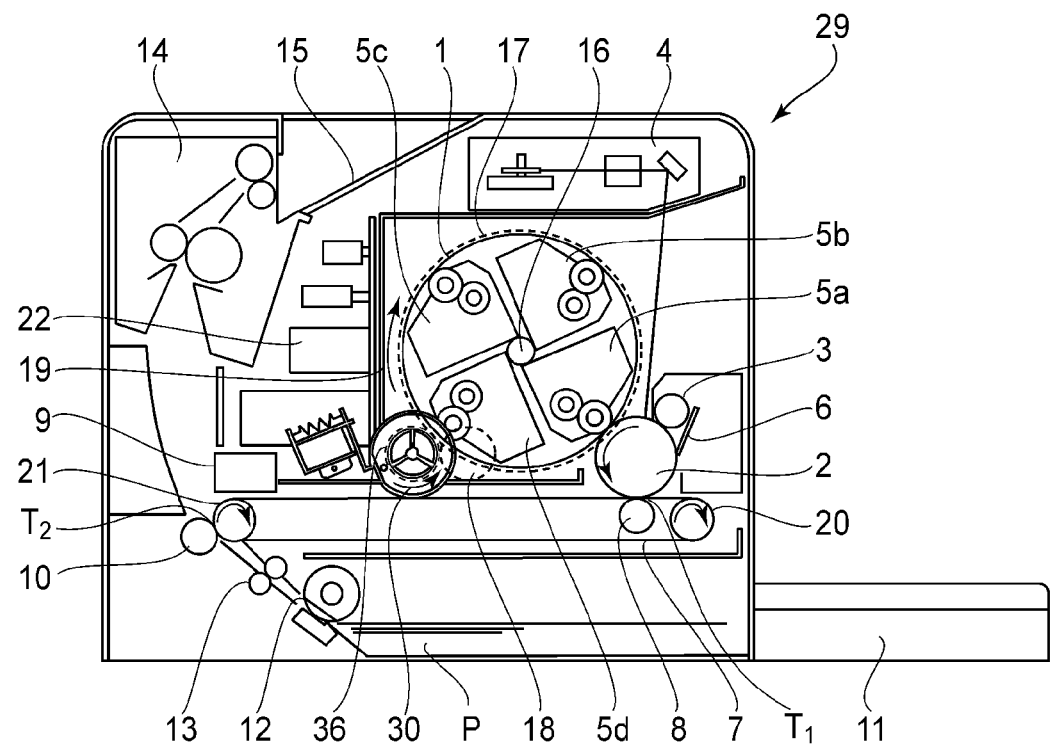
FIG. 1 is a sectional view of an image forming apparatus in Embodiment 1.

FIG. 1 is a sectional view of the image forming apparatus 29 by which the present invention is carried out.

On a photosensitive drum 2, an electrostatic latent image is formed by a scanner unit 4. Further, a cartridge 5 which is a developing device mounted in the developing rotary 1 contacts the photosensitive drum 2, so that the electrostatic latent image is developed into a toner image. The toner image formed on the photosensitive drum 2 is primary-transferred onto an intermediary transfer belt 7 rotationally driven by a driving roller 20.

Figure 8:
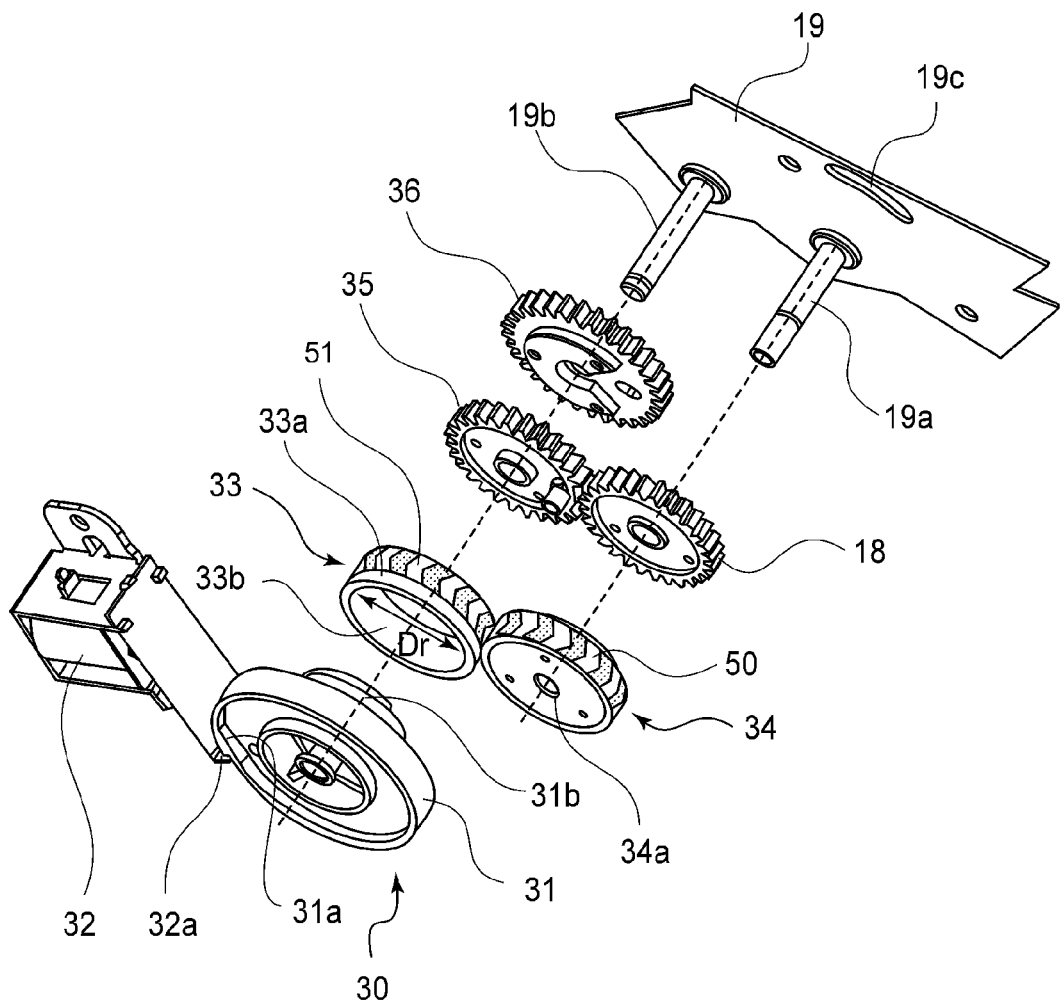
FIG. 8 is a perspective view of a rotary rotation control clutch in Embodiment 2.

In the case of forming a color image, a rotational driving force is transmitted from a driving portion (not shown) of the image forming apparatus 29 to a rotary driving gear 17, provided at an end portion of the rotary 1, via a rotation control clutch 30 (FIG. 8) to rotate the rotary 1. The rotary 1 mountably and demountably holds a cartridge 5a containing yellow toner, a cartridge 5b containing magenta toner, a cartridge 5c containing cyan toner, and a cartridge 5d containing black toner. By the rotation of the rotary 1, each of the plurality of cartridges 5a to 5d is moved to a developing position at which each cartridge opposes the photosensitive drum 2 and at the developing position, the electrostatic latent image is developed into the toner image. The thus formed toner images are successively transferred from the photosensitive drum 2 onto the intermediary transfer belt 7 at a primary transfer point T1 created by a primary transfer roller 8, so that the toner images are superposed to form a color image.

Thereafter, the toner images transferred onto the intermediary transfer belt 7 are moved to a secondary transfer point T2, created by a driving roller 21 and a secondary transfer roller 10, by the rotation of the driving roller 20.

Further, a sheet material P which is a recording material (medium) separated and fed by a sheet feeding roller 12 is subjected to adjustment of its leading end position by a registration roller pair 13 and thereafter is conveyed to the secondary transfer point T2. Then, the color image formed on the intermediary transfer belt 7 is transferred onto the sheet material P by applying a bias to the secondary transfer roller 10.

Then, the color image (toner image) transferred on the sheet material P is heated and pressed by a fixing device 14, thus being fixed on the sheet material P, which is then discharged on an upper cover 15.

[Rotation Control Clutch]

Next, a constitution of the rotation control clutch 30 will be described.

Figure 5:
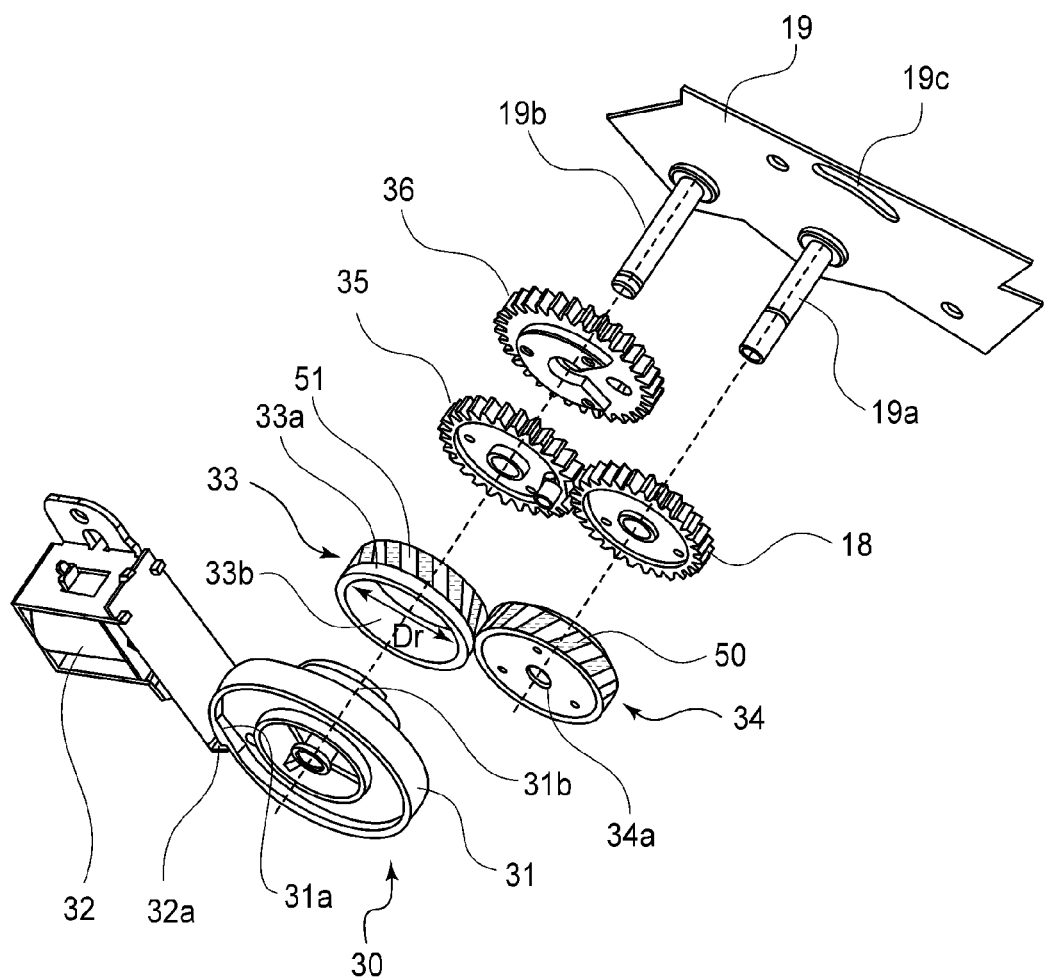
FIG. 5 is a perspective view of the rotary rotation control clutch in Embodiment 1.

FIG. 5 is a perspective view of the rotary rotation control clutch.

when the rotary 1 (FIG. 1) is stopped, a clutch control ring 31 rotatably provided on a clutch shaft 19b provided on a main assembly side plate 19 is locked so that its locking latch 31a is locked at a flapper end 32a of a solenoid 32 which is a holding member (held state). That is, the rotation of the clutch control ring 31 is stopped. The clutch control ring 31 is provided with a circumferential portion 31b having an outer diameter Di on which a flange ring 51 having an inner diameter Dr is rotatably and coaxially provided. That is, the circumferential portion 31b which is an entering portion enters an inside of the ring 51 which is a cylindrical member. Further, a clutch-side partly non-toothed gear 35 and a rotary output gear 36 are also coaxially fixed on the clutch control ring 31. At this time, Dr>Di is satisfied.

Further, an input gear 18 is rotatably by an input gear shaft 19a provided on the main assembly side plate 19 so as to engage with the clutch-side partly non-toothed gear 35, and a driving member 34 is coaxially fixed on the input gear 18.

Figure 2:
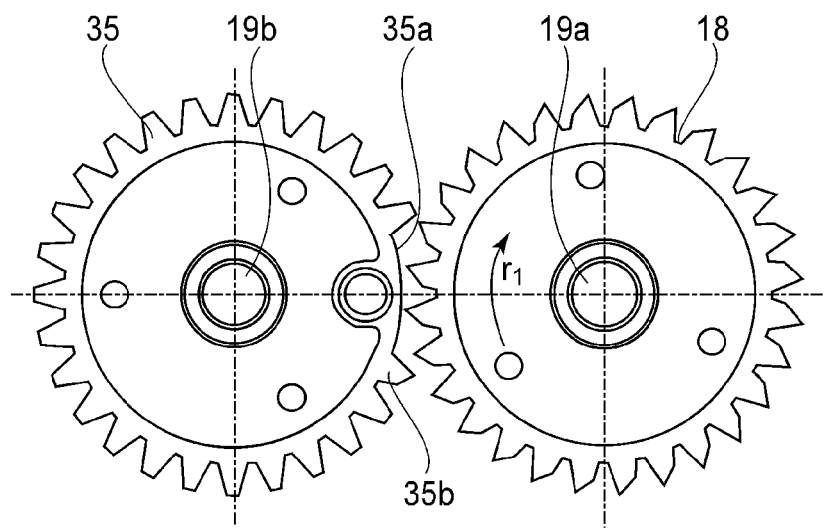
FIG. 2 is a partly enlarged view of a rotary rotation control clutch in Embodiment 1.

FIG. 2 shows positions of the input gear 18 and the partly non-toothed gear 35 when the rotation control clutch 30 is disconnected. That is, a non-toothed portion 35a of the partly non-toothed gear 35 opposes the input gear 18 and the input gear 18 rotates in a direction indicated by an arrow r1, so that a rotational driving force from a driving portion of the image forming apparatus is interrupted.

Figure 6:
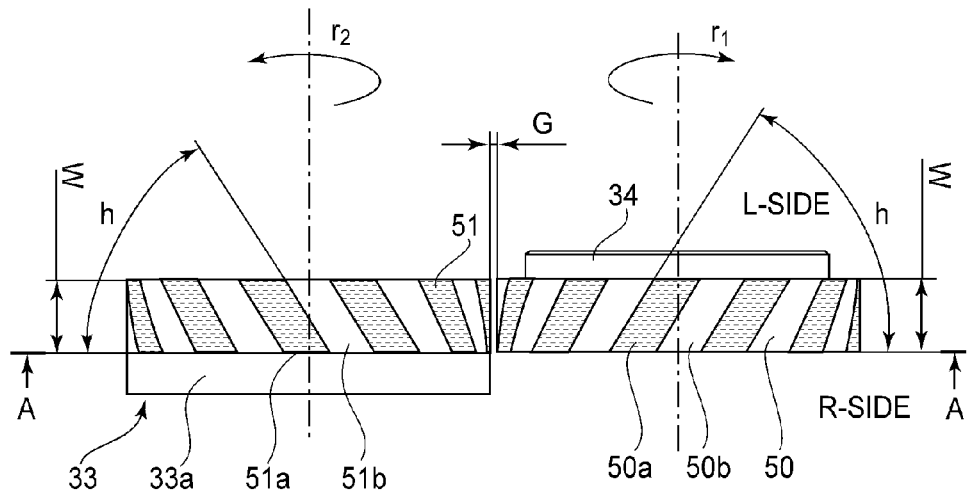
FIG. 6 is a partly enlarged view of the rotary rotation control clutch in Embodiment 1.

Next, with reference to FIG. 6, a positional relation between the driving member 34 and the ring 33 which is the cylindrical member will be described.

On the driving member 34, a cylindrical drive-side magnet 50 which is a second magnet is fixed. A cylindrical driven-side magnet 51 which is a first magnet is fixed so that its circumferential surface opposes the circumferential surface of the drive-side magnet 50 with a predetermined gap G therebetween. On the circumferential surface of the drive-side magnet 50, an N pole 50a of the cylindrical first magnet 50 and an S pole 50b having the same shape as that of the N pole 50a are formed alternately and tilted at a helical angle h.

On the circumferential surface of the driven-side magnet 51, an N pole 51a of the driven-side magnet 51 and an S pole 51b having the same shape as that of the N pole 51a are formed alternately and tilted with the helical angle h.

Figure 7:
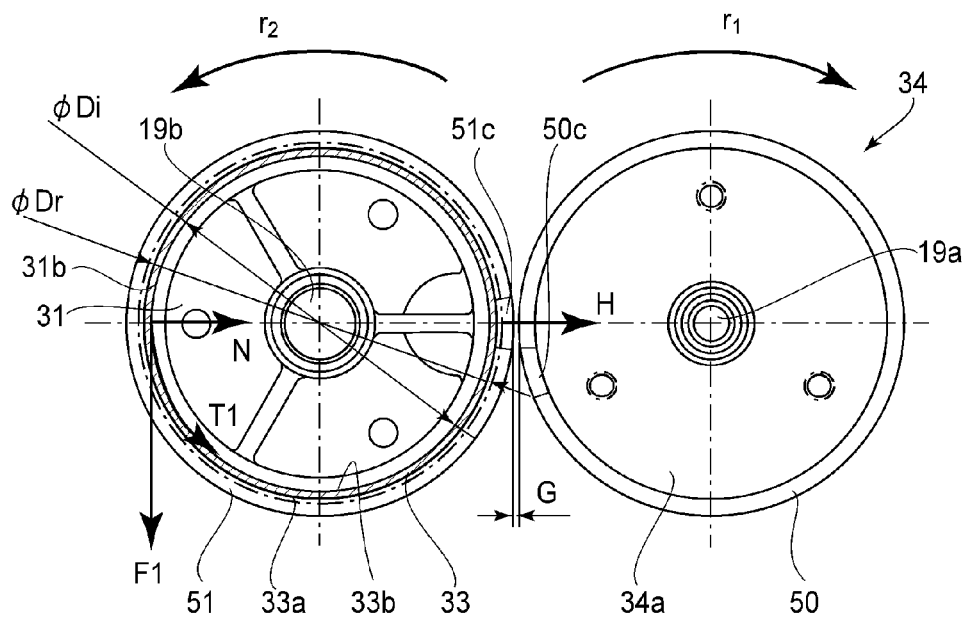
FIG. 7 is a sectional view of the rotary rotation control clutch in Embodiment 1.

The drive-side magnet 50 and the driven-side magnet 51 have the same number of magnetic poles, and mutually different poles oppose each other while generating an attraction force H (FIG. 7). This positional relationship such that the different poles oppose each other is kept irrespective of a rest period and a rotation period. The attraction force H acts in a direction crossing an axial (shaft) direction of the driven-side magnet 51.

As shown in FIG. 7, the driving member 34 starts its rotation in the direction indicated by the arrow r1. At that time, as shown in FIG. 6, the N pole 50a of the drive-side magnet 50 and the S pole 51b of the driven-side magnet 51 oppose each other at positions separated with the gap G on L-side of the magnets having a width W. By the attraction force H between the N pole 50a and the S pole 51b, the ring 33 is ringed in a direction indicated by an arrow r2 by one magnetic pole. Here, the N pole 50a and the S pole 51a are disposed obliquely, so that when the N pole 50a and the S pole 51b oppose each other on R-side of the magnets having the width W, the magnets are moved to positions in which the S pole 50b of the cylindrical drive-side magnet 50 and the N pole 51a of the cylindrical driven-side magnet 51 oppose each other. Similarly, the ring 33 is rotated in the direction indicated by the arrow r2 by one magnetic pole. This movement is repeated, so that the ring 33 is rotated in the arrow r2 direction by the rotation of the driving member 34 in the arrow r1 direction.

FIG. 7 shows a locating position of the driving member 34, the ring 33 and the clutch control ring 31. A center distance between the driving member 34 and the clutch control ring 31 is fixed. Further, in order to set the predetermined gap G, the center distance between the input gear shaft 19a and the clutch shaft 19b is appropriately adjusted.

Next, friction between the ring 33 and the clutch control ring 31 will be described.

The driving member 34 and the drive-side magnet 50 which are coaxially fixed on the input gear 18 rotate the ring 33, which is rotatably provided on the circumferential surface 31b of the clutch control ring 31 and which is provided with the driven-side magnet 51, at a substantially constant speed while keeping the gap G. In this case, when a resistance coefficient by the magnetic force between a circumferential member 34b of the driving member 34 and an outer peripheral portion 33a of the ring 33 is μ1 and a friction efficient between an inner peripheral portion 33b of the ring 33 and the circumferential portion 31b of the control ring 31 is μ2, stable rotation of the ring 33 is kept when μ1≧μ2 is satisfied. Further, at the same time, the attraction force H generates a contact force N of the inner peripheral portion 33b of the ring 33 toward the circumferential portion 31b of the control ring 31. The ring 33 is urged against the circumferential portion 31b of the control ring 31 by the contact force N generates a frictional force F1 which is a tangential force for rotating the clutch control ring 31 in the same rotational direction during the rotation thereof. The frictional coefficient between the inner peripheral portion 33b of the ring 33 and the circumferential portion 31b of the control ring 31 is μ2 and therefore F1=μ2×N is satisfied. Further, when a diameter of the circumferential portion 31b of the control ring 31 is Di, a torque T1 for rotating the ring 33 and the control ring 31 in the same direction can be represented by T1=F1×(Di/2). This torque is referred to as a rotation-together torque.

Next, a method of moving the cartridge 5 to the developing position will be described.

Figure 3:
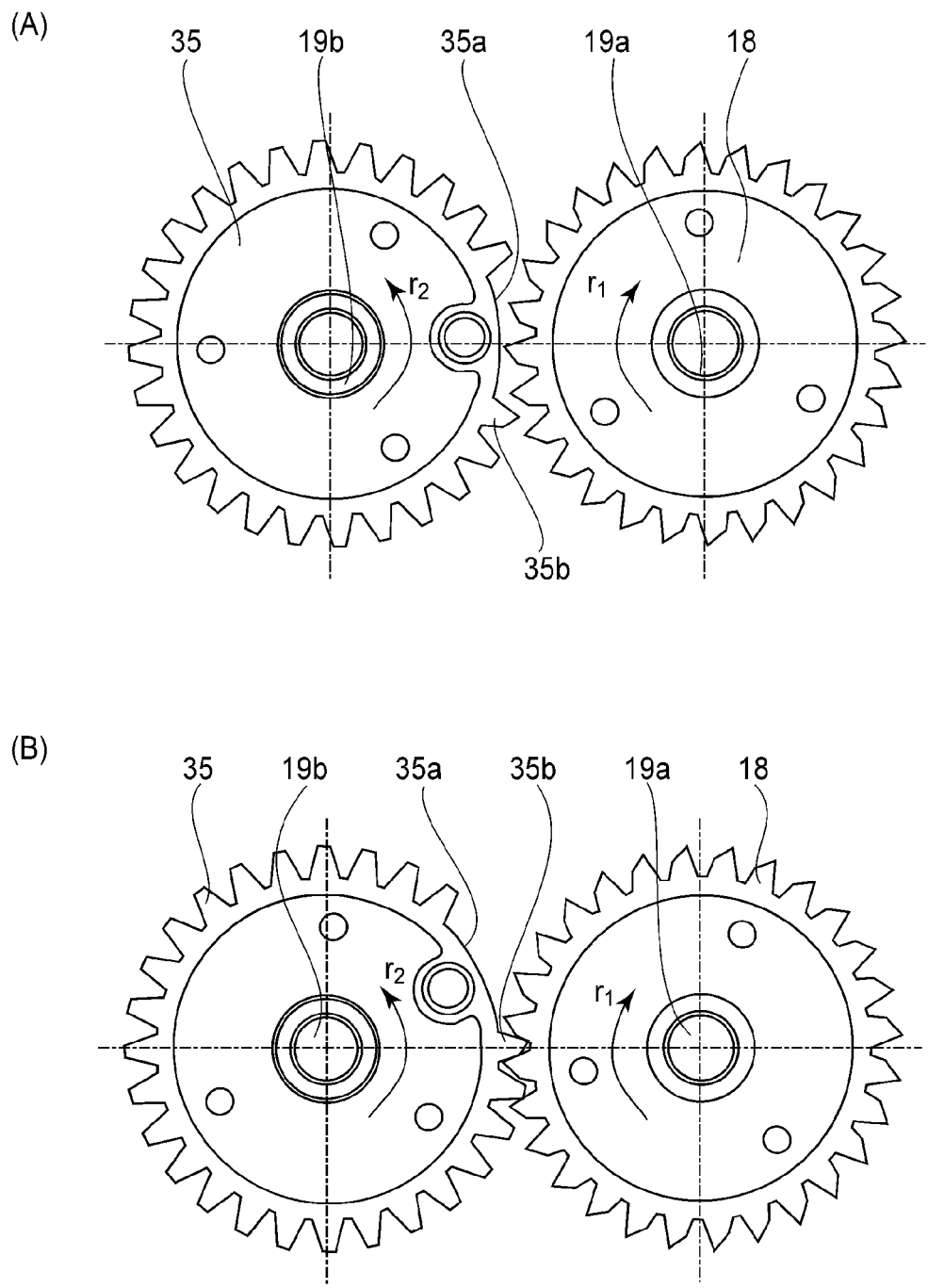
FIGS. 3(A) and 3(B) are partly enlarged views of the rotary rotation control clutch in Embodiment 1.

Referring to FIGS. 3(A) and 5, when the solenoid 32 is energized, the flapper end 32a of the solenoid 32 is moved, so that the locking of the clutch control ring 31 at the flapper end 32a is released (released state). The clutch control ring 31 on which the rotation-together torque T1 acts, and the partly non-toothed gear 35 and the rotary output gear 36 which are fixed on the clutch control ring 31 start rotation in the arrow r2 direction, against a rotation load of the rotary 1 on clutch downstream side, which is a direction in which the partly non-toothed gear 35 engages with the input gear 18 at the substantially same speed as that of the input gear 18.

As shown in FIG. 3(B), the partly non-toothed gear 35 and the input gear 18 rotate at the substantially same speed, so that a tooth of the input gear 18 starts engagement with a first tooth 35b1 of a toothed portion 35b of the partly non-toothed gear 35 at the substantially same speed.

Then, teeth of the input gear 18 and teeth of the partly non-toothed gear 35 successively engage with each other, so that the rotational driving force supplied from the driving portion (not shown) of the image forming apparatus is transmitted to a rotary input gear 17 through the rotary output gear 36. Then, the rotary 1 is rotated by a distance corresponding to one rotation of the rotary output gear 36. Thus, a desired cartridge 5 in the rotary 1 is moved to the developing position, in which the latent image formed on the photosensitive drum 2 is developed onto the toner image.

When the clutch control ring 31 is subjected to one rotation, the flapper end 22a of the solenoid 32 which has been returned to a rotation locking position contacts the locking latch 31a provided on the clutch control ring 31. Then, the clutch control ring 31 is stopped, so that the non-toothed portion 35a of the partly non-toothed gear 35 opposes the input gear 18 again and the input gear 18 is rotated without engaging with the partly non-toothed gear 35. Thus, the rotational driving force from the driving portion is interrupted.

In this way, the clutch control ring 31 is again in a state in which it awaits connection (transmission) of the rotational driving force but in a subsequent step, as described above, the toner image on the photosensitive drum 2 is transferred and carried on the intermediary transfer belt 7 and reaches the first transfer point T1 by the rotation of the driving roller 20.

Incidentally, in this embodiment, the rotary input gear is provided on the drive output side but the present invention is not limited thereto. For example, on the drive output side, the sheet feeding roller may also be provided.

Embodiment 2

FIGS. 8 to 11 are schematic views of a rotary rotation control clutch in this embodiment. A constitution and an action of the rotary rotation control clutch shown in FIG. 8 (perspective view) are similar to those of the rotary rotation control clutch shown in FIG. 5 in Embodiment 1 but are different from those of the rotary rotation control clutch shown in FIG. 5 in Embodiment 1 in that a magnetic pole shape provided at a circumferential surface of each of cylindrical magnets is different from that in Embodiment 1. Other constitutions of the image forming apparatus are similar to those of the image forming apparatus in Embodiment 1.

First, with reference to FIG. 9, a positional relation between the driving member 34 and the ring 33 will be described.

On the driving member 34, a drive-side magnet 50 is fixed. A driven-side magnet 51 is fixed so that its circumferential surface opposes the circumferential surface of the drive-side magnet 50 with a predetermined gap G therebetween. In this embodiment, the drive-side magnet 50 and the driven-side magnet 51 have the same shape and the same magnetic pole shape. Further, in this embodiment, identical two magnets are used. On the circumferential surface of the drive-side magnet 50, an N pole 50a of the drive-side magnet 50 and an S pole 50b of the drive-side magnet 50 having the same shape as that of the N pole 50a are formed alternately and include a bent portion (or a corner K) which is symmetrical with respect to a center line C of the magnet having a width W and which has an angle K formed with the center line C as a bisector of the angle K.

On the circumferential surface of the driven-side magnet 51, an N pole 51a of the driven-side magnet 51 and an S pole 51b of the driven-side magnet 51 having the same shape as that of the N pole 51a are formed alternately and include a bent portion (or a corner K) which is symmetrical with respect to a center line C of the magnet having a width W and which has an angle K formed with the center line C as a bisector of the angle K.

Two cylindrical magnets consisting of the drive-side magnet 50 and the driven-side magnet 51 have mutually different poles oppose each other at positions between which the gap G which is also the shortest distance is created while generating an attraction force H. This positional relationship such that the different poles oppose each other is kept irrespective of a rest period and a rotation period. The attraction force H acts in a direction crossing an axial (shaft) direction of the driven-side magnet 51.

Figure 9:
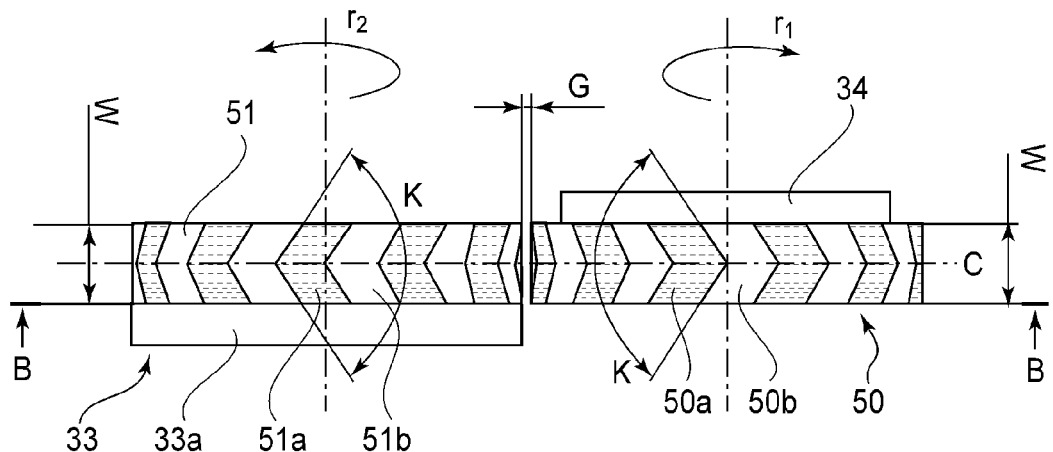
FIG. 9 is a partly enlarged view of the rotary rotation control clutch in Embodiment 2.

By the rotation of the driving member 34, as shown in FIG. 9, the drive-side magnet 50 starts its rotation in the arrow r1 direction. Then, the driven-side magnet 51 separated from the drive-side magnet 50 by the magnetic gap G starts to oppose the driven-side magnet 51 from their mutually different poles at the bent portion bent the center of the magnet having the width W with respect to the widthwise direction in FIG. 9, thus starting the rotation of the driven-side magnet 51. After the mutually different poles of the magnets 50 and 51 oppose each other over the full width W, the magnetic pole of the magnet 50 opposes an associated (different) magnetic pole of the magnet 51 at two widthwise end points thereof and the ring 33 is leftward rotated by a distance corresponding to one magnetic pole, so that subsequent mutually different poles of the magnets 50 and 51 oppose each other.

Incidentally, a process in which an i-th N pole Ni of the drive-side magnet 50 opposes a j-th S pole Sj of the driven-side magnet 51 at the position of the gap G will be described more specifically with reference to FIG. 10, Table 1, and FIG. 11.

Figure 10:
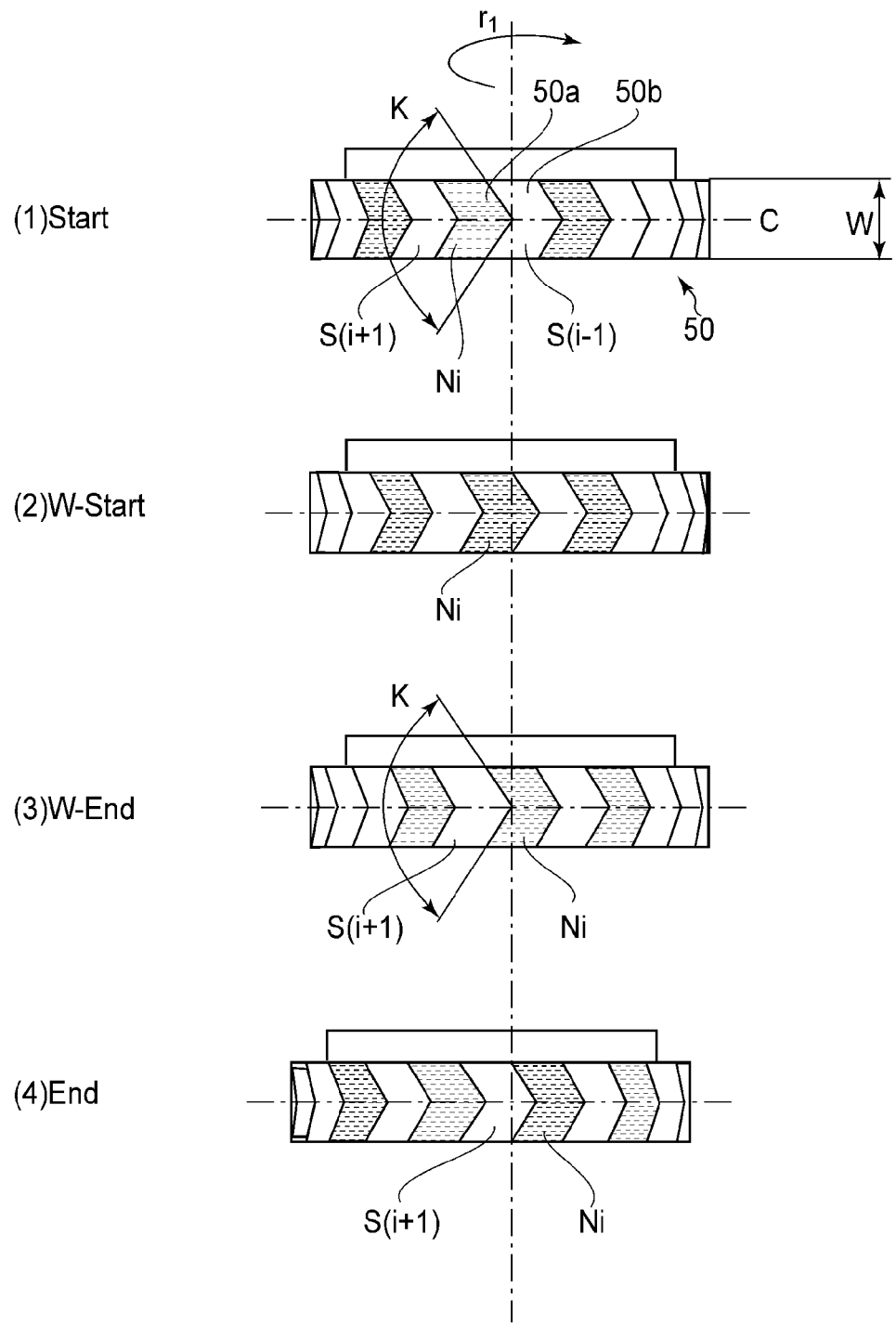
FIG. 10 is a partly enlarged view of the rotary rotation control clutch in Embodiment 2.

FIG. 10 shows a process in which the i-th N pole Ni of the drive-side magnet 50 passes through the gap G while opposing the j-th S pole Sj of the driven-side magnet 51 at the position of the gap G. In FIG. 10, an observer views the drive-side magnet 50 from a side on which the driven-side magnet 51 is located, and the drive-side magnet 50 is rotated rightward. Further, the driven-side magnet 51 is omitted from illustration.

The process in which the i-th N pole Ni of the drive-side magnet 50 passes through the gap G is summarized in the following Table 1.

TABLE 1

|      | Magnet for | (1) Start | (2) W-start | (3) W-end | (4) End |
|------|------------|-----------|-------------|-----------|---------|
| Main | Driving member | Ni – K | Ni – W | Ni – W | Ni – R |
|      | Ring | Sj – K | Sj – W | Sj – W | Sj – R |
| Sub  | Driving member | S(i – 1) – W | S(i – 1) – R | S(i + 1) – K | S(i + 1) – W |
|      | Ring | N(j – 1) – W | N(j – 1) – R | N(j + 1) – K | N(j + 1) – W |
|      | Number of pair | 2 | 1 | 1 | 2 |

In Table 1, "Main" represents that the N pole Ni of the magnet 50 opposes the S pole Si of the magnet 51. "Sub" represents that S poles S(i–1) and S(i+1) before and after the N pole Ni of the magnet 50 oppose N poles N(j–1) and N(j+1) before and after the S pole Sj of the magnet 51, respectively. "Number of pair" represents the number of opposing magnetic pole pairs. "(1) Start" represents a point of time when the corner K of the N pole Ni reaches the magnetic gap G position. "(2) W-start" represents a point of time when widthwise ends of the N pole Ni having the width W reach the magnetic gap G position. "(3) W-end" represents a point of time when the widthwise ends of the N pole Ni are deviated from (out of) the magnetic gap G position. "(4) End" represents a point of time when both near ends of the N pole Ni are deviated from the magnetic gap G position and means an end point of one magnetic pole pair.

Data in Table 10 represent positions of the associated magnetic poles. Specifically, e.g., "Ni-K" represents that the N pole Ni is located at the magnetic gap G position at the point of time of "(1) Start". "Ni-W" represents that the widthwise ends of the N pole Ni are located at the magnetic gap G position at the points of time of "(2) W-start" and "(3) W-end". "Ni-R" represents that the both rear end of the N pole Ni are located at the magnetic gap G position at the point of time of "(4) End".

From FIG. 10 and Table 1, it is understood that the i-th N pole Ni of the drive-side magnet 50 starts to oppose the j-th S pole Sj of the driven-side magnet 51 from the center of the corner K while a preceding magnetic pole pair of the S pole S(i–1) of the drive-side magnet 50 and the N pole N(j–1) of the driven-side magnet 51 start to oppose each other. Further, it is also understood that the opposing magnetic pole positions of the cylindrical magnets are then gradually changed to the widthwise magnetic pole ends of the magnets while gradually increasing the opposing width and finally that the opposing magnetic positions of the magnets end at the both rear magnetic pole ends of the magnets while a subsequent magnetic pole pair of the S pole S(i+1) of the drive-side magnet 50 and the N pole N(j+1) of the driven-side magnet 51 start to oppose each other. The i-th N pole Ni of the drive-side magnet 50 and the j-th S pole Sj of the driven-side magnet 51 oppose each other to generates the attraction force H, so that the ring 33 is rotated in the direction opposite to the rotational direction of the driving member 34 by one magnetic pole as described above.

Figure 11:
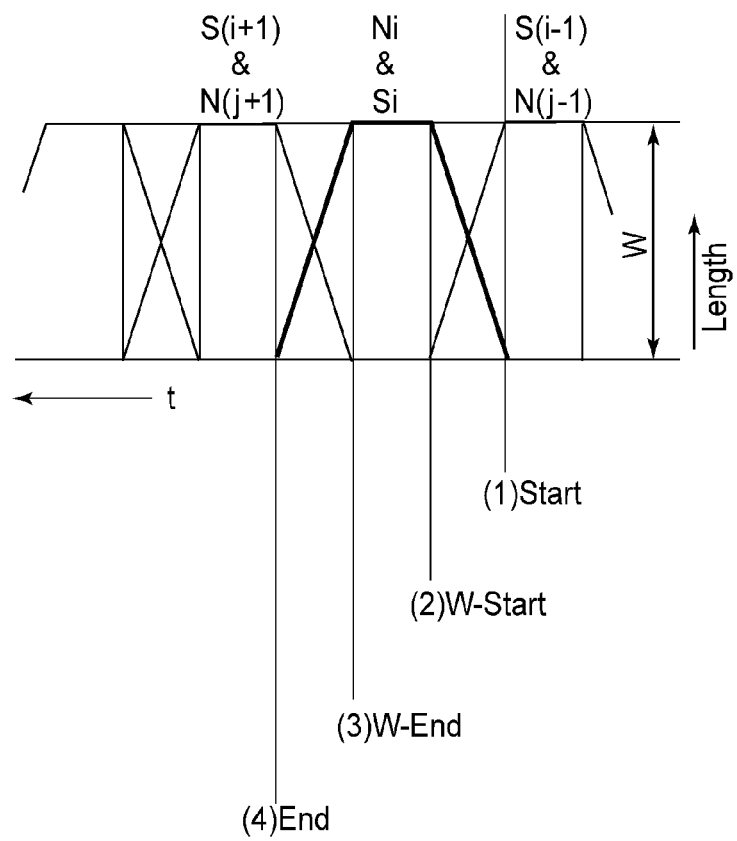
FIG. 11 is an operation characteristic diagram of the rotary rotation control clutch in Embodiment 2.

FIG. 11 is a graph showing a change in opposing width between the i-th N pole Ni of the drive-side magnet 50 and the j-th S pole Sj of the driven-side magnet 51. Further, a sectional view taken along B-B line and viewed from the indicated direction in FIG. 9 is similar to FIG. 7. Other constitutions and actions in this embodiment are similar to those in Embodiment 1.

As described above, in this embodiment, the rotational speeds of the input gear and the partly non-toothed gear can substantially coincide with each other, so that it is possible to alleviate impact and noise due to tooth contact (abutment) during the engagement between the input gear and the partly non-toothed gear.

Further, the driving member for generating the contact force is disposed coaxially with the input gear, so that it is possible to provide compared with the conventional constitution in which the spring is provided, the rotation control clutch with a simple structure and with high reliability.

Further, the ring is rotated by the magnetic force, so that there are no occurrences of heat generation by sliding friction between the ring and the driving member, abrasion (wearing) between the ring and the driving member, and noise caused by the sliding friction between the ring and the driving member.

Further, the ring and the driving member are magnetically connected by the magnetic force and therefore even when the rotation of the ring is inhibited or abruptly stopped, the magnetic connection is released as in the case of a torque limiter, so that the driving member and a driving system for the driving member are prevented from being damaged.

Further, in this embodiment, a portion to which the maximum attraction force is applied (a magnetic gap passing portion) is gradually moved from the ring center portion to the widthwise ends of the cylindrical magnet, so that tilting of the ring is prevented within a radial jerky of the ring and thus local abrasion of the circumferential surface of the clutch control ring and noise are also alleviated.

Embodiment 3

Figure 12:
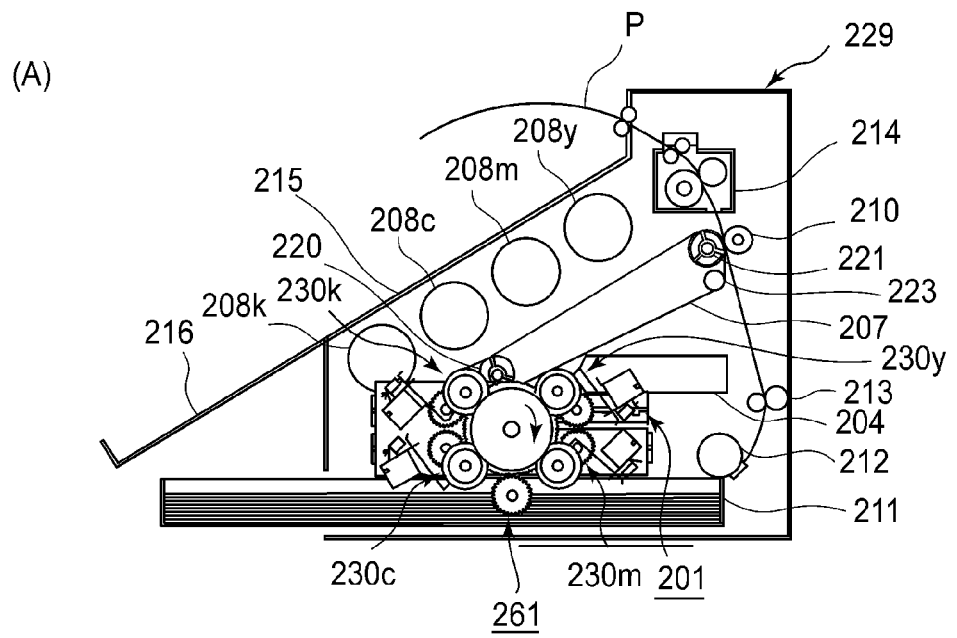
FIGS. 12(A) and 12(B) are sectional views showing an image forming apparatus including a plurality of rotation control clutches in Embodiment 3.
Figure 12:
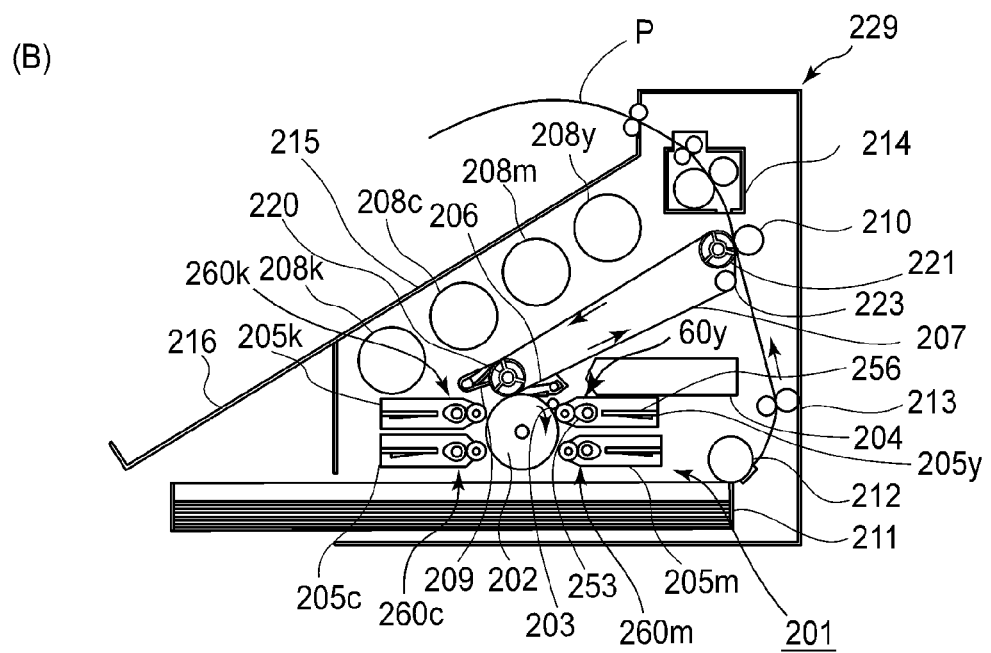

FIGS. 12(A) and 12(B) show an image forming apparatus to which a rotation control clutch which is the driving device in this embodiment according to the present invention is applied. An image forming apparatus 229 includes a photosensitive drum 202 and a developing device contact-and-separation unit 201 provided with a plurality of developing devices 205 (205y, 205m, 205c and 205k), which are disposed in the neighborhood of the photosensitive drum 202, for developing a latent image on the photosensitive drum 202. The developing device contact-and-separation unit 201 is provided with contact-and-separation mechanisms 260 (260y, 260m, 260c and 260k) for moving associated ones of the developing devices 205 to a contact position and a separated position relative to the photosensitive drum 202 (FIG. 12(B)). The contact-and-separation mechanism 260 includes a contact-and-separation cam 253 and in a driving force transmission mechanism 261 for transmitting the driving force to the contact-and-separation cam 253, rotation control clutches 230 (230y, 230m, 230c and 230k) according to the present invention are provided (FIG. 12(A)). The contact-and-separation cam 253 of each of the contact-and-separation mechanisms 260 is selectively driven by a rotational driving force transmitted through an associated one of the rotation control clutches 230.

In the following description, in the case where there is need to discriminate individual contact-and-separation mechanisms 260 and individual rotation control clutches 230, similarly as in the case of the developing devices 205, the same suffixes y, m, c and k are added. Further, in the case where there is no need to discriminate the mechanisms 260 and the clutches 230, the suffixes y, m, c and k are not particularly added.

First, an image forming operation will be described. As shown in FIG. 12(B), a surface of the photosensitive drum 202 cleaned by a drum cleaner 206 is electrically charged, and a latent image is written (formed) by a scanner unit 204. A desired any one of the developing devices 205y, 205m, 205c and 205k of the developing device contact-and-separation unit 201 is brought into contact with the photosensitive drum 202 on which the latent image is borne, so that the latent image is developed into a toner image. Respective color toners are contained in toner containers 208y, 208m, 208c and 208k and are supplied to the respective (associated) developing devices through unshown toner supply paths.

The toner image on the photosensitive drum 202 is primary-transferred onto an intermediary transfer belt 207 rotationally driven by a driving roller 220. The toner which has not been transferred onto the intermediary transfer belt 7 is removed and collected by the drum cleaner 206. In the case where subsequent different color toner image is intended to be transferred, the rotational driving force from an unshown image forming apparatus driving portion is transmitted to the contact-and-separation cam 253 of the contact-and-separation mechanism 260 associated with the developing device for a predetermined color (the subsequent different color) through an associated rotation control clutch 230.

By the rotation of the contact-and-separation cam 253, the developing device 205 for the subsequent different color contacts the photosensitive drum 202 to develop an associated latent image into the subsequent different color toner image. Toner images developed in the above-described manner are successively transferred and superposed on the intermediary transfer belt 7 to form a desired color toner image. In this way, the contact-and-separation cam 253 is rotated by the rotational driving force transmitted by the rotation control clutch 230, so that the drive (movement) of the developing device 205, relative to the photosensitive drum 202, between a contact position and a separated position is performed.

Thereafter, the desired color toner image carried on the intermediary transfer belt 7 reaches a secondary transfer roller 210 by the rotation of the driving roller 220. On the other hand, a sheet material P such as paper separated and fed from a sheet feeding portion 211 by a sheet feeding roller 212 is positionally aligned by a registration roller pair 213 and thereafter reaches the secondary transfer roller 210. The desired color toner image is transferred and carried on the sheet material P such as paper sandwiched between the secondary transfer roller 210 and the intermediary transfer belt 207 which is stretched by a stretching roller 221 and then is pressed and fusion-fixed by a fixing device 214. Thereafter, the sheet material P is discharged on an upper cover 215 or a sheet discharge tray 216. Residual toner on the intermediary transfer belt 7 is removed and collected by a belt cleaner 209. Incidentally, in FIGS. 12(A) and 12(B), a tension roller 223 for applying tension to the intermediary transfer belt 7 is disposed.

Next, constitutions and operations of the contact-and-separation mechanism 260 and the rotation control clutch 230 of the developing device contact-and-separation unit 201 in the image forming apparatus 229 operated as described above will be described.

Figure 13:
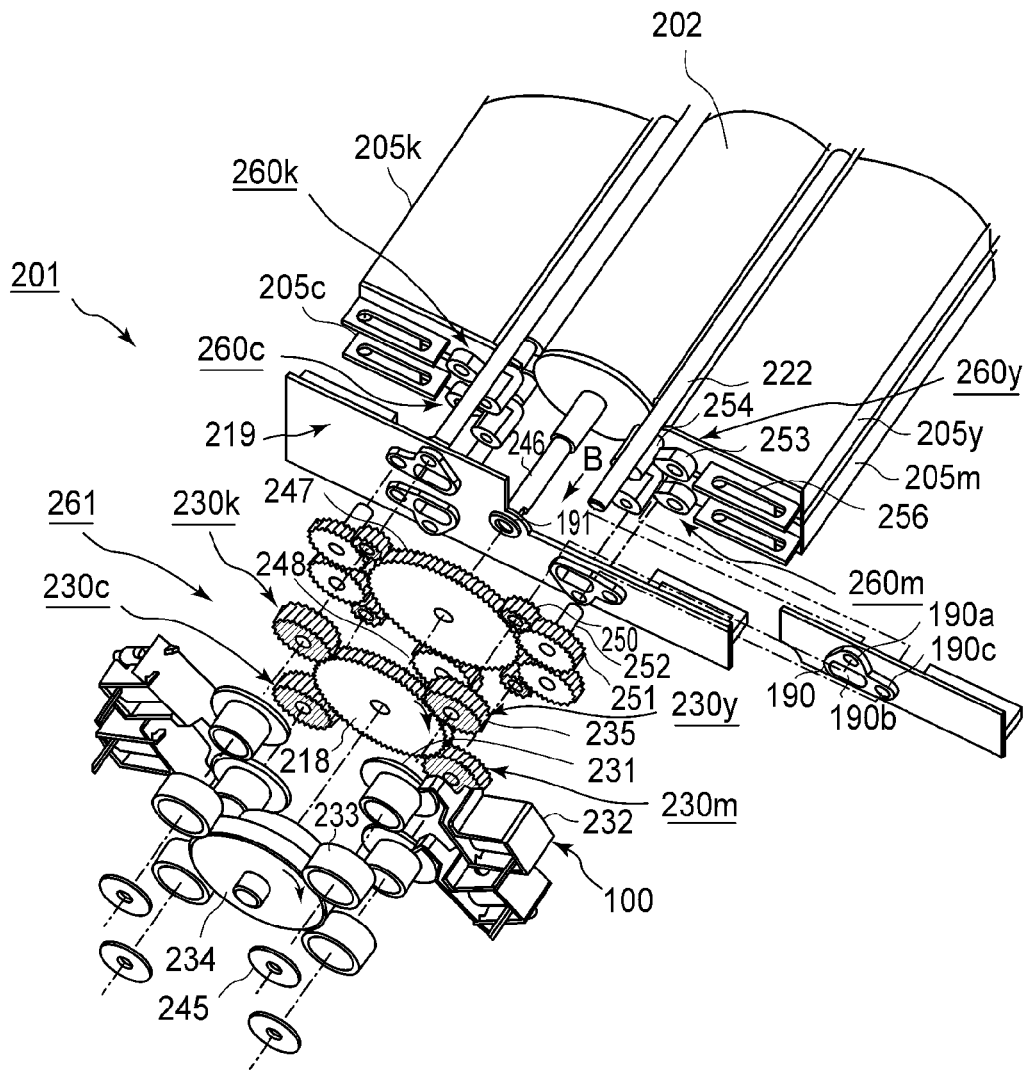
FIG. 13 is an exploded perspective view of a drive-transmission system including the rotation control clutch shown in FIG. 1.

At an initial stage or a stage before the developing device 205 for the subsequent different color is brought into contact with the photosensitive drum 202, the rotation of all the contact-and-separation cams 253 is stopped, i.e., all the rotation control clutches 230 are disconnected. FIG. 13 is an exploded perspective view of the developing device contact-and-separation unit 201 and a drive transmission system in this embodiment. FIG. 13 shows a constitution of parts and the contact-and-separation cam 253 is located at an arbitrary position. In FIG. 13, a multistage gear is illustrated by being disconnected and divided into portions corresponding to mating gear portions to be engaged with the divided portions for convenience of illustration. For example, a clutch gear 250, a partly non-toothed gear 235 and a control ring 231 are an integral part or are fixed on the same shaft. Similarly, a drum gear 247, an input gear 218 and a ring driving roller 234 are an integral part or are fixed on the same shaft.

The developing device contact-and-separation unit 201 is roughly classified into the contact-and-separation mechanism 260 accommodated inside a side plate 219 and the driving force transmission mechanism 261 located outside the side plate 219. For the contact-and-separation mechanism 260, a first developing device 205y and a fourth developing device 205k are disposed substantially symmetrically bilaterally with respect to a line segment passing through a center axis (shaft) of the photosensitive drum 202. Similarly, a second developing device 205m and a third developing device 205c are also disposed substantially symmetrically bilaterally with respect to the line segment. Further, the rotation control clutches 230 are also disposed substantially symmetrically bilaterally with respect to the line segment. An end of each developing device shown in FIG. 13 and the other end (not shown) of each developing device provide a bilaterally symmetrical configuration and are constituted by the same parts. The driving force transmission mechanism 261 includes the rotation control clutches 230 equal in number to the developing devices 205 and is constituted as follows.

Hereinbelow, with reference to FIGS. 13, 14(A), 14(B), 15(A) and 15(B), the description will be made by taking a single rotation control clutch 230y as an example.

The rotation control clutch 230y is provided at one end portion of a clutch shaft 222 which passes through a shaft hole 190a of a shaft supporting member 190 provided on the side plate 219 and which is rotatably provided. The rotation control clutch 230y includes the input gear 218, the partly non-toothed gear 235 and a control mechanism 100 for controlling an engagement state between the partly non-toothed gear 235 and the input gear 218.

The input gear 218 is provided on a drum shaft 246 which passes through the side plate 219 via a bearing 191 and which is rotatably provided. The input gear 218 is utilized in common among the partly non-toothed gears 235 of the respective rotation control clutches 230 (230y, 230m, 230c and 230k).

Figure 15:
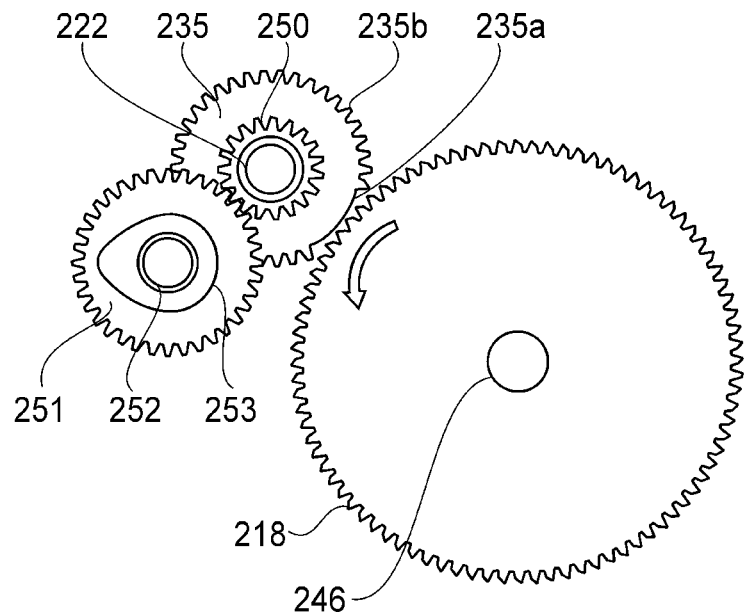
FIG. 15(A) is a schematic view showing an engaging state of a gear train of the rotation control clutch.
FIG. 15(B) is an enlarged view of a control mechanism.
Figure 15:
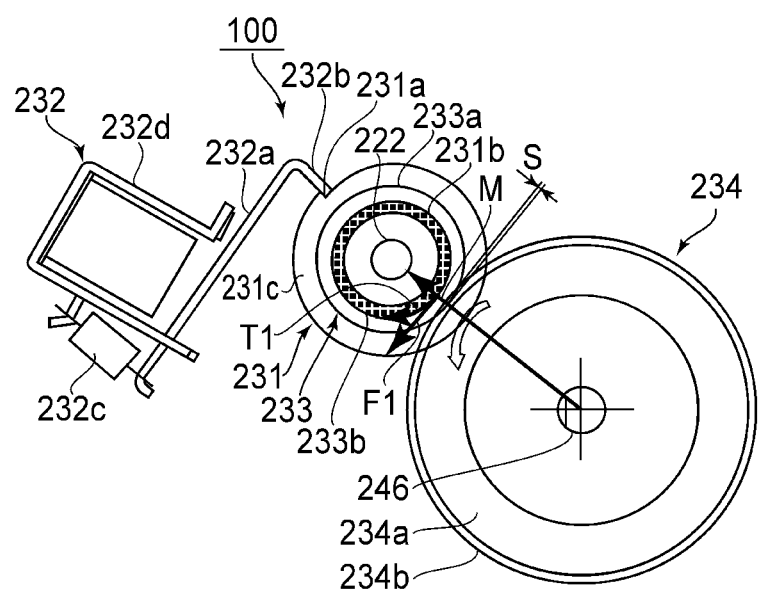

Each partly non-toothed gear 235 includes a toothed area 235b in which the partly non-toothed gear 235 is engageable with the input gear 218 and includes a non-toothed area 235a in which the partly non-toothed gear 235 is not engaged with the input gear 218 (FIG. 15(A)).

The control mechanism 100 positions the non-toothed area 235a of the partly non-toothed gear 235 at an opposing position in which the non-toothed area 235a opposes the input gear 218 during interruption of the driving force (transmission), thus interrupting the driving force transmission from the input gear 218 to the partly non-toothed gear 235. On the other hand, during the driving force transmission, the control mechanism 100 positions the toothed area 235b of the partly non-toothed gear 235 at the opposing position in which the toothed area 235b opposes the input gear 218, thus transmitting the driving force from the input gear 218 to the partly non-toothed gear 235 by a circumferential distance of the toothed area 235a engageable with the input gear 218. On the partly non-toothed gear 235, the clutch gear 250 as an output means for outputting the driving force toward a downstream side of the driving force transmission.

The control mechanism 100 includes a control ring 231 coaxially fixed on the partly non-toothed gear 235 and includes a ring 233 which is a cylindrical member which is rotatably and slidably contactable to the control ring 231 at a predetermined contact pressure. Further, the control mechanism 100 includes a ring driving roller 234 as a ring driving means and includes a solenoid 232 which is holding member for controlling rotation and rotation stop of the control ring 231.

Figure 14:
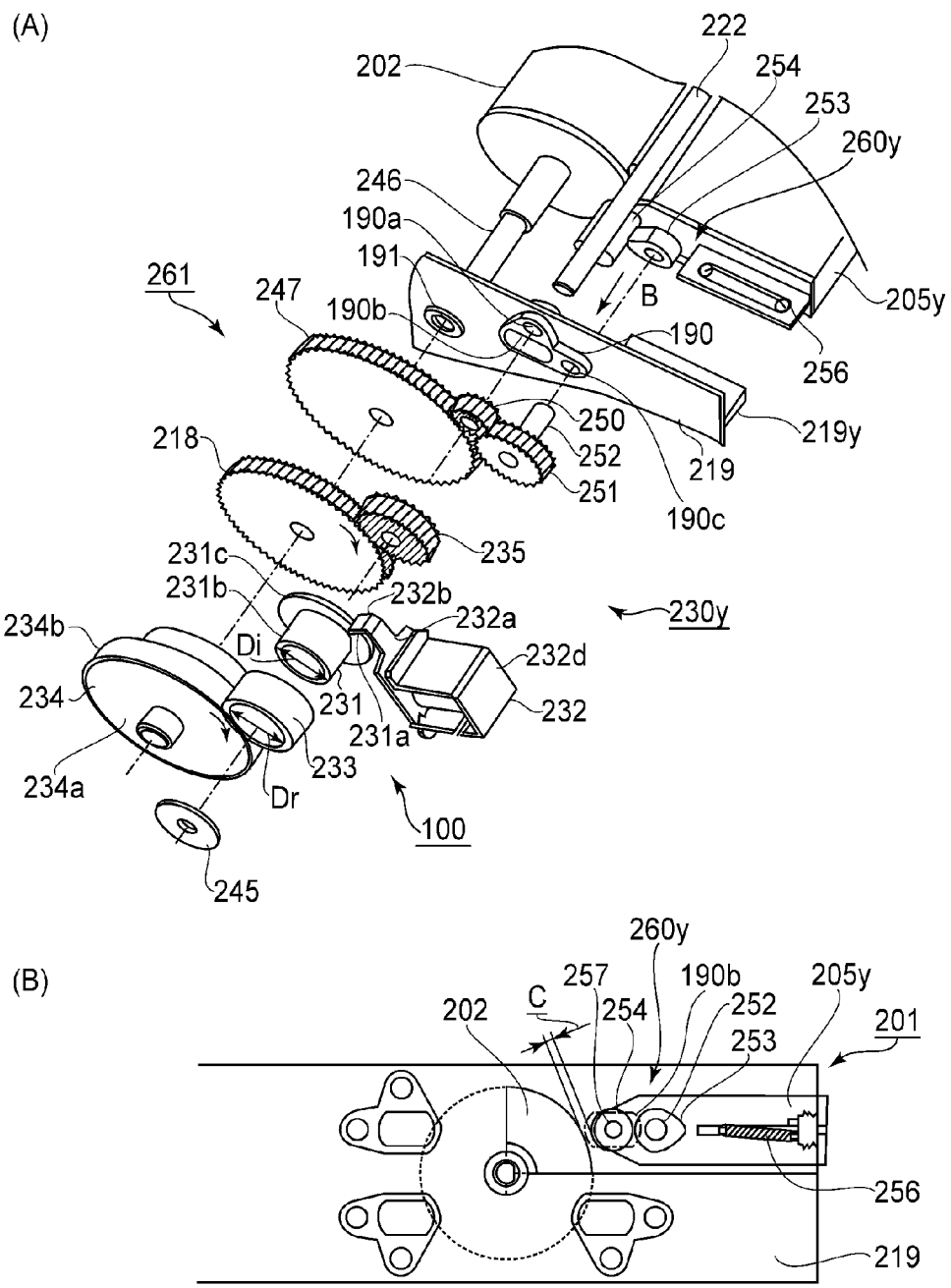
FIG. 14(A) is an enlarged perspective view of the rotation control clutch shown in FIG. 2.
FIG. 14(B) is a partly enlarged view of a contact-and-separation mechanism.

The control ring 231 is, as shown in FIG. 14(A), shaped in a cylinder provided with a flange and includes a cylindrical control ring body 231b having an outer diameter Di at an outer circumferential surface and includes a flange portion 231c radically protruded from the control ring body 231b. The flange portion 231c is provided with a locking latch 231a. The locking latch 231b has a stepped shape such that a hook-like flapper end portion 232b is to be locked by the locking latch 231a. Incidentally, the flange portion 231c is provided at an end portion of the control ring body 231b on the partly non-toothed gear 235 side when viewed in an axial direction.

The ring 233 is a cylindrical member formed of metal and is rotatably and slidably engaged on an outer circumferential portion of the control ring body 231b (FIGS. 14(A) and 15(B)). When the ring 233 has an inner diameter Dr, the inner diameter Dr and the outer diameter Di of the control ring body 231b are set to satisfy a relationship: Dr>Di. That is, the control ring body 231 which is an entering member enters the inside of the ring 233 which is the cylindrical member. Incidentally, in FIGS. 13 and 14(A), a washer 245 for preventing the ring 233 from being disconnected from the control ring body 231b is provided.

The ring driving roller 234 is fixed on the drum shaft 246 coaxially with the input gear 218 and is rotationally driven together with the input gear 218. An outer diameter of the ring driving roller 234 is equal to a pitch diameter of the input gear 218. The ring driving roller 234 is rotated at the same peripheral speed as that of the input gear 218 and is utilized in common among rings 233 of the control mechanisms 100 for the respective rotation control clutches 230 (230y, 230m, 230c and 230k). An outer circumferential surface of the ring driving roller 234 contacts an outer circumferential surface of the ring 233 at a predetermined urging force, so that the ring 233 is rotationally driven by a contact-frictional force between the outer circumferential surfaces of the ring driving roller 234 and the ring 233. When the ring 233 is rotationally driven, a rotational torque is transmitted to the control ring 231 by a contact-frictional force between an inner circumferential surface of the ring 233 and the control ring 231. The ring driving roller 234 includes a roller body 234a and a roller circumferential portion 234b which is an elastic member provided on the outer circumferential surface of the roller body 234a. The roller circumferential portion 234b contacts the metal ring 233 in a compressed state.

The solenoid 232 locks the control ring 231 to prevent the rotation of the control ring 231 and lock-releases the control ring 231 to permit the rotation of the control ring 231. The solenoid 232 includes, as shown in FIGS. 14(A) and 15(B), a flapper 232a and a solenoid body 232d for driving the flapper 232a. The flapper 232a is swingably supported by the solenoid body 233d. In an example shown in FIG. 15(B), the flapper end portion 232b is always urged against the locking latch 231a of the control ring 231 in a locking direction by a spring force of a spring 232c. The flapper end portion 232b has a hook-like shape by bending. Further, by exciting the solenoid body 232d, the flapper end portion 232b is configured to be disengaged from the locking latch 231a against the spring force of the spring 232c.

The flapper end portion 232b of the flapper 232a of the solenoid 232 caused to lock the control ring 231, so that the control ring 231 is stopped in a state in which the non-toothed area 235a is located at the opposing position in which the non-toothed area 235a opposes the input gear 218 (FIG. 15(A)). At the same time, with respect to the control ring 231, the ring 233 is placed in an interruption state in which transmission of an idling engaging force is interrupted. On the other hand, by releasing the locking of the control ring 231, the control ring 231 is rotated by the contact-frictional force with the ring 233, so that the partly non-toothed gear 235 fixed coaxially with the control ring 231 is rotated. Then, the tooth of the toothed area 235a is engaged with the input gear 218, thus being placed in a transmission state in which the driving force is transmitted.

In FIGS. 14(A) and 14(B), the contact-and-separation mechanism 260 includes the contact-and-separation cam 253 provided correspondingly to the developing device 205. A slider 254 for supporting a developing roller 257 of each developing device 205 is slidably engageable in an elongated hole 190b provided in the side plate 219. By the slider 254 and the elongated hole 190b, the developing roller 257 is supported so as to be reciprocally movable between the contact position in which the developing roller 257 contacts the photosensitive drum 202 and the separated position in which the developing roller 257 contacts the photosensitive drum 202 and the separated position in which the developing roller 257 is separated from the photosensitive drum 202. Each developing device 205 is always urged by a tension spring 256 in a direction in which the developing device 205 is separated from the photosensitive drum 202, so that a cam surface of the contact-and-separation cam 253 contacts the slider 254. By 180 degree-rotation of the contact-and-separation cam 253, the slider 254 is moved between the contact position and the separated position. The contact-and-separation cam 253 is driven by a cam shaft 252. On the side plate 219, a receiving portion 219y for supporting the developing device 205y is provided.

The cam shaft 252 is fixed in a cam gear 251, described later, engageable with the clutch gear 250 fixed integrally with the partly non-toothed gear 235 and is supported in a shaft hole 190c provided in the shaft supporting member 190 (FIG. 15(A)).

FIG. 15(A) shows rotational positions of the input gear 218 and the partly non-toothed gear 235 when the developing device 205y is in the separated state. This positional relation in FIG. 15(A) is illustrated when the gears 218 and 235 are viewed from a direction indicated by an arrow B in FIG. 14(A). In FIG. 15(A), the non-toothed area 235a of the partly non-toothed gear 235 opposes the input gear 218, so that the input gear is idled. Further, the rotational driving force transmitted from an unshown image forming apparatus driving portion via a driving gear 248 (FIG. 13) is not transmitted to the clutch shaft 222.

FIG. 15(B) shows a positional relation among the ring driving roller 234, the ring 233 and the control ring 231 when the developing device 205y is in the separated state. This positional relation is also illustrated when these members are viewed from the direction indicated by the arrow B in FIG. 14(A). In FIG. 15(B), a cross section of the control ring 231 is shown, and a center distance between the ring driving roller 234 and the control ring 231 is fixed. In order to set a desired entering amount S at a contact portion between the ring driving roller 234 and the ring 233, the center distance between the drum shaft 246 and the clutch shaft 222 can be appropriately adjusted. The entering amount S means a depth (overlapping length) through which the ring 233 enters a phantom shape of the ring driving roller 234. Further, in the case of fixing the center distance, the center distance can be arbitrarily set dimension-adjusting at least one of the outer diameter of a ring outer diameter portion 233a and the outer diameter of a roller circumferential portion 234b of the ring driving roller 234. As a result, the ring 233 which is the cylindrical member is urged in a direction crossing the axis of the ring 233, so that a contact pressure M by which the ring 233 is urged against the control ring 231 can be adjusted.

Referring to FIG. 15(B), a process in which the contact pressure M generates a rotationally driving torque T1 in the control ring 231 will be described. In FIG. 15(B), the roller circumferential portion 234b, which is elastic, of the ring driving roller 234 fixed coaxially with the input gear 218 (FIG. 15(A)) rotates the ring 233 rotatably engaged on the outer circumferential surface of the control ring body 231b while keeping the entering amount S.

At this time, a friction coefficient between contact surfaces of the ring outer diameter portion 233a and the roller circumferential portion 234b of the ring driving roller 234 is taken as $\mu1$, and a friction coefficient between contact surfaces of a ring inner diameter portion 233b and the control ring body 231b is taken as $\mu2$. When the friction coefficients $\mu1$ and $\mu2$ satisfy: $\mu1 \geq \mu2$, a frictional torque on the outer circumferential surface side of the ring 233 is increased, so that the ring 233 is stably rotated in synchronism with the ring driving roller 234.

On the other hand, the entering amount S generates the contact pressure M toward the ring inner diameter portion 233b and the control ring body 231b. The contact pressure M acts in a direction crossing the axis of the control ring body 231b which is the entering portion. The ring 233 urged against the control ring body 231b by the contact pressure M generates, during its rotation, a tangential force F1 for causing the control ring 231 at rest to rotate in the same rotational direction.

The friction coefficient between the ring inner diameter portion 233b and the control ring body 231b is $\mu2$, so that $F1=\mu2 \times M$ is satisfied. Further, when a diameter of the control ring body 231b is Di, the rotationally driving torque T1 for causing the control ring 231 to rotate together with the ring 233 in the same rotational direction can be represented by: $T1=F1 \times (Di/2)$.

A method of bringing the developing device 205y into contact with the photosensitive drum 202 will be described below.

Referring to FIG. 15(B), the solenoid 232 is energized. Then, the solenoid body 232d is excited, so that the flapper 232a is magnetically attracted to the solenoid body 232d. As a result, the flapper end portion 232b is disengaged from the locking latch 231a of the control ring 231, so that rotation locking of the control ring 231 is released. The control ring 231 on which the above-described rotationally driving torque T1 of the ring 233 is exerted, and the partly non-toothed gear 235 (FIG. 16(A)) fixed on the control ring 231 start to rotate in a direction, in which the partly non-toothed gear 235 engages with the input gear 218, against a rotation load exerted on a downstream side with respect to a driving force transmitting direction.

Figure 16:
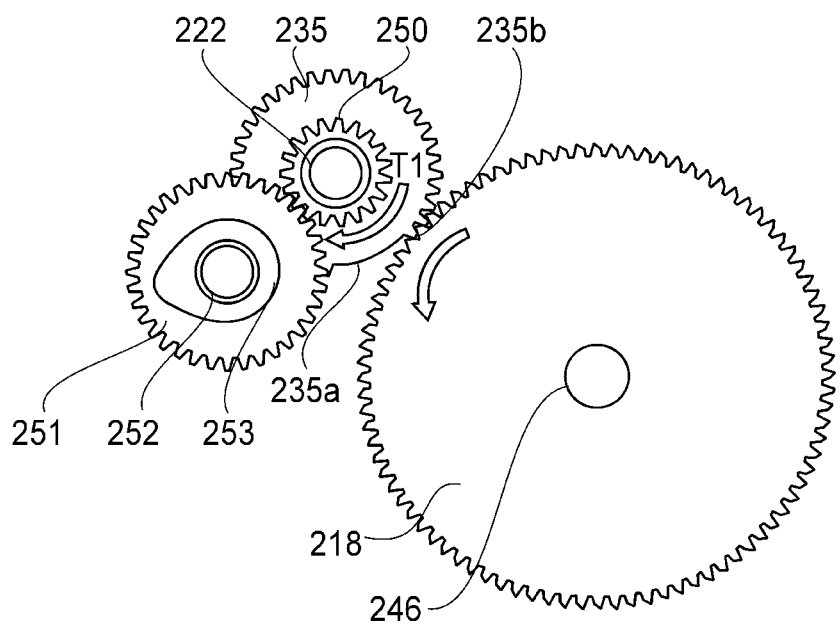
FIG. 16(A) is a schematic view showing a driving force transmission state of the rotation control clutch.
FIG. 16(B) is a schematic view showing a preventing state of the driving force transmission.
Figure 16:
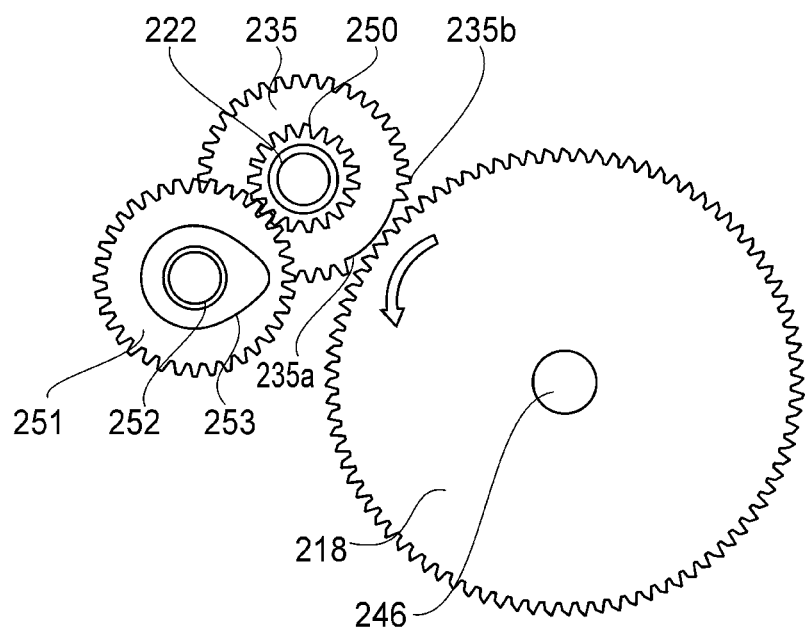

Referring to FIG. 16(A), the rotationally driving torque T1 is generated in the control ring 231 and therefore the partly non-toothed gear 235 fixed on the control ring 231 is also rotated, so that a tooth of the input gear 218 engages with a first tooth of the toothed area 235b of the partly non-toothed gear 235 to establish engagement between the input gear 218 and the partly non-toothed gear 235. Then, associated teeth of these two gears 218 and 235 successively engage with each other, so that the rotational driving force supplied from the unshown image forming apparatus driving portion to the input gear 218 is transmitted to the partly non-toothed gear 235. Thus, the clutch gear 250 fixed on the partly non-toothed gear 235 is rotated by an angle corresponding to one full circumference unit the non-toothed area 235a opposes the input gear 218 again (FIG. 16(B)). The cam gear 251 engaging with the clutch gear 250 has the number of teeth which is two times that of the clutch gear, so that the contact-and-separation cam 253 fixed on the cam shaft 252 is rotated 180 degrees from an initial separated position shown in FIG. 15(A).

Further, in FIG. 15(B), when the control ring 231 rotates through one full circumference, the flapper end portion 232b of the solenoid 232 locks the locking latch 231a provided on the control ring 231 to stop the control ring 231. In this state, the non-toothed area 235a of the partly non-toothed gear 235 is located again at the opposing position in which the non-toothed area 235a opposes the input gear 218 and the input gear 218 is idled, so that the rotational driving force supplied from the unshown image forming apparatus driving portion is (transmission-)interrupted (FIG. 16(B)).

Figure 17:
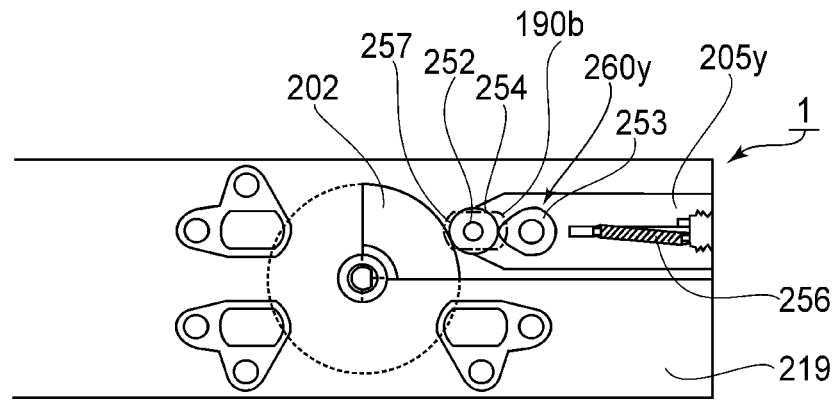
FIGS. 17(A) and 17(B) are schematic views for illustrating an operating state of a contact cam of the contact-and-separation mechanism.
Figure 17:
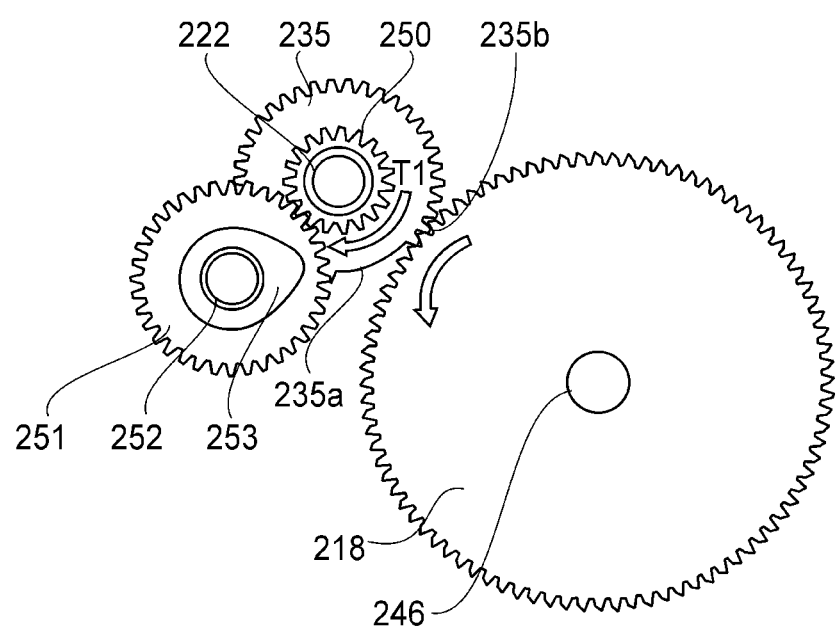

On the other hand, as shown in FIG. 17(A)), the contact-and-separation cam 253 rotated 180 degrees from the initial position moves the slider 254 rotationally supporting the developing roller 257 toward the photosensitive drum 202 side along the elongated hole 219b of the side plate 219 against the spring force of the tension spring 256. Then, the developing roller 257 contacts the photosensitive drum 202. In this way, a contact operation of the developing device 205y is completed.

Next, a separation operation of the developing device 205y will be described. In FIGS. 16(B) and 17(A), when the solenoid body 232d of the rotation control clutch 230 for which the rotational driving force has been interrupted after the primary transfer of the single color toner image is energized again, the rotation control clutch 230 operates similarly as in the case of the contact operation.

That is, in FIG. 15(B), the flapper end portion 232b of the solenoid 232 is moved, so that the locking state of the control ring 231 is released.

Further, the control ring 231 on which the above-described rotationally driving torque T1 of the ring 233 is exerted, and the partly non-toothed gear 235 fixed on the control ring 231 start to rotate in a direction, in which the partly non-toothed gear 235 engages with the input gear 218, against a rotation load exerted on its downstream side. The rotationally driving torque T1 is generated in the control ring 231 and therefore the partly non-toothed gear 235 fixed on the control ring 231 is also rotated, so that a tooth of the input gear 218 engages with a first tooth of the toothed area 235b of the partly non-toothed gear 235 to establish engagement between the input gear 218 and the partly non-toothed gear 235 (FIG. 17(B)). Thereafter, associated teeth of the input gear 218 and the toothed area 235b of the partly non-toothed gear 235 successively engage with each other. Then, by the rotational driving force supplied from the unshown image forming apparatus driving portion, the clutch-side partly non-toothed gear 235 and the clutch gear 250 are rotated by an angle corresponding to one full circumference unit the non-toothed area 235a opposes the input gear 218 again. The cam gear 251 engaging with the clutch gear 250 has the number of teeth which is two times that of the clutch gear. For this reason, the contact-and-separation cam 253 fixed on the cam shaft 252 is further rotated 180 degrees, i.e., 360 degrees in total, from the initial position shown in FIG. 15(A) and is returned to the separated stable shown in FIG. 14(B).

Further, in FIG. 15(B), when the control ring 231 rotates through one full circumference, the flapper end portion 232b of the solenoid 232 locks again the locking latch 231a provided on the control ring 231 to stop the control ring 231. The non-toothed area 235a of the partly non-toothed gear 235 opposes again the input gear 218 and the input gear 218 is idled, so that the rotational driving force supplied from the image forming apparatus driving portion is (transmission-)interrupted. In this way, the separation operation of the developing device 205y is completed. Further, each of other developing devices 205 are successively subjected to contact with and separation from the photosensitive drum 202 in a desired order by the above-described methods, so that the latent image is developed into a single color toner image and the toner image is transferred and superposed on the intermediary transfer belt 7. Thus, primary transfer is completed.

According to this Embodiment 2, the plurality of developing devices 205 (205y, 205m, 205c and 205k) is disposed at bilaterally symmetrical positions of the photosensitive drum 202 without being stacked on one side, so that it is possible to use a small-diameter photosensitive drum 202 compared with the case where the developing devices are stacked on one side. Therefore, it becomes possible to suppress the height of the developing device contact-and-separation unit 201 and the height of a main assembly of the image forming apparatus, so that it is possible to provide a compact image forming apparatus, capable of being disposed irrespective of place, with no visual feeling of tightness.

Further, in the contact-and-separation operation of the developing devices 205 (205y, 205m, 205c and 205k), the rotation control clutches 230 (230y, 230m, 230c and 230k) disposed around the photosensitive drum 202 is rotationally driven by the single input gear 218 fixed on the drum shaft 246. Therefore, it becomes possible to realize efficient power transmission with a short power transmission path and to realize reduction in the number of parts. At the same time, it is possible to provide an image forming apparatus with high reliability.

Figure 24:
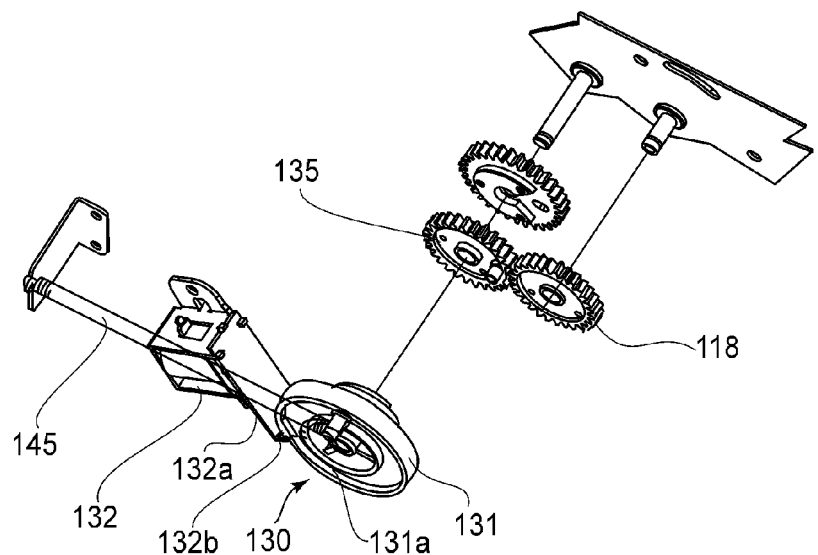
FIG. 24(A) is an exploded perspective view of a conventional rotation control clutch.
FIG. 24(B) is a schematic view showing a partly non-toothed gear and a neighborhood thereof.
Figure 24:
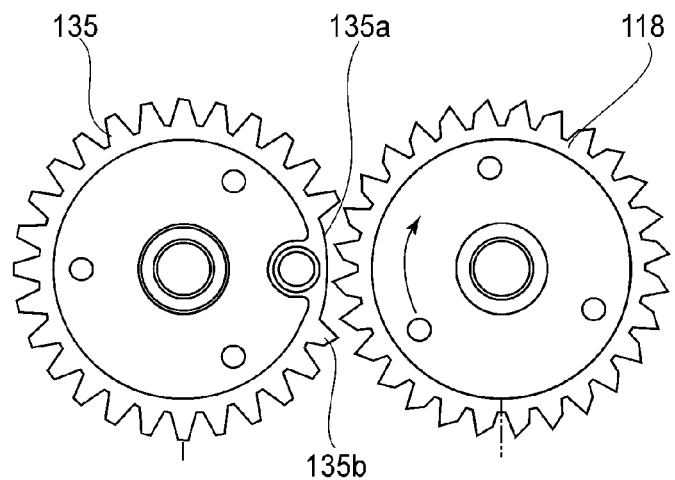

Further, the impact during the engagement of the input gear 218 with the first tooth of the toothed area 235b of the partly non-toothed gear 235 is absorbed by the friction between the control ring 231 and the ring 233, so that the impact is alleviated. Particularly, the partly non-toothed gear 235 engages with the input gear 218 at the substantially same rotational speed, so that impact noise of the tooth contact can be further alleviated. Further, a control ring spring 145 for rotation-urging the control ring 131 as shown in FIG. 24(A) can be omitted. Further, in the driving force transmission system for the image forming apparatus, the metal ring 233 having large inertial force is rotated, so that it is possible to alleviate shock due to the (transmission-)interruption and transmission of the driving force. Further, the ring driving roller 234 which generates the contact pressure against the ring 233 is disposed coaxially with the input gear 218, so that it is possible to provide a rotation control clutch with high reliability by a simple and inexpensive structure.

Next, other embodiments of the present invention will be described. In the following embodiments, only a point of difference from Embodiment 3 will be described. Constitutional portions identical to those in Embodiment 3 are represented by the same reference numerals or symbols, thus being omitted from description.

Embodiment 4

Figure 18:
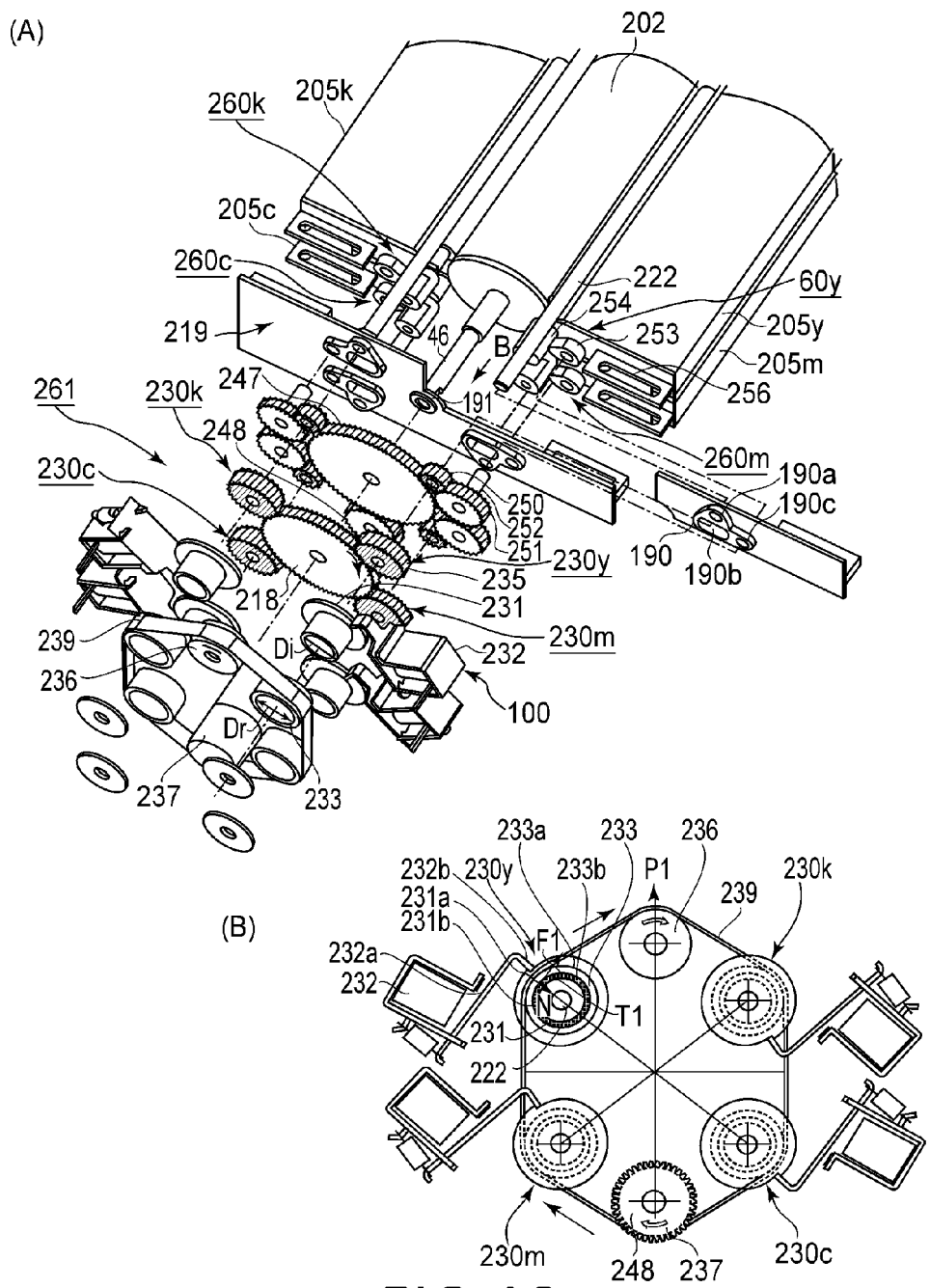

FIGS. 18(A) and 18(B) show the developing device contact-and-separation unit 201 for an image forming apparatus to which a rotation control clutch in this embodiment according to the present invention is applied.

This embodiment is different from Embodiment 3 in that the ring driving means for rotationally driving the rings 233 is a driving belt 239 extended around the rings 233. That is, in FIGS. 18(A) and 18(B), the driving belt 239 is wound and extended around circumferential surfaces of the rings 233 of the four rotation control clutches 230 (230y, 230m, 230c and 230k). To each of the rings 233, the driving force is transmitted by the driving belt 239. The driving belt 239 is also wound and extended around a driving pulley 237 for rotationally driving the driving belt 239 and a tension pulley 236 for adjusting tension of the driving belt 239, in addition to the four rings 233. The driving pulley 237 is disposed centrally below the left rotation control clutches 230y and 230m and the right rotation control clutches 230k and 230c. On the other hand, the tension pulley 236 is disposed centrally above the left rotation control clutches 230y and 230m and the right rotation control clutches 230k and 230c.

Hereinafter, similarly as in Embodiment 3, by focusing attention on the rotation control clutch 230y for one developing device 205y, a process in which the contact pressure M applied from the ring 233 to the control ring 231 generates the rotationally driving torque T1 in the control ring 231 will be described.

The driving pulley 237 is coaxially fixed on the driving gear 248 which is fixed coaxially with a drive-side gear provided at an unshown image forming apparatus driving portion. The tension pulley around which the driving belt 239 is stretched is supplied with an urging force P1 from an unshown urging means and thus generates the tension on the driving belt 239.

When a resistance coefficient the driving belt 239 and the ring outer diameter portion 233a is µ1 and a friction efficient between the ring inner diameter portion 233b and the outer circumferential surface of the control ring body 231b is µ2, stable rotation of the ring 233 is kept when µ1≧µ2 is satisfied. Further, at the same time, the tension P of the driving belt 239 generates the contact pressure M of the ring inner diameter portion 233b toward the control ring body 231b. The ring 233 urged against the control ring body 231b by the contact pressure M generates the tangential force F1 for rotating the control ring 231 at rest in the same rotational direction during the rotation thereof. The frictional coefficient between the ring inner diameter portion 233b and the control ring body 231b is μ2 and therefore F1=μ2×M is satisfied. Further, when a diameter of the control ring body 231b is Di, a torque T1 for rotating the ring 233 and the control ring 231 in the same direction can be represented by T1=F1×(Di/2) similarly as in Embodiment 3.

The method of causing the developing device 205y to contact and be separated from the photosensitive drum 202 is similar to that in Embodiment 3.

In this embodiment, the driving belt 239 has a flat belt shape but may also be a round belt, a belt having a square cross-section, and a synchronous (toothed) belt.

Embodiment 5

Figure 19:
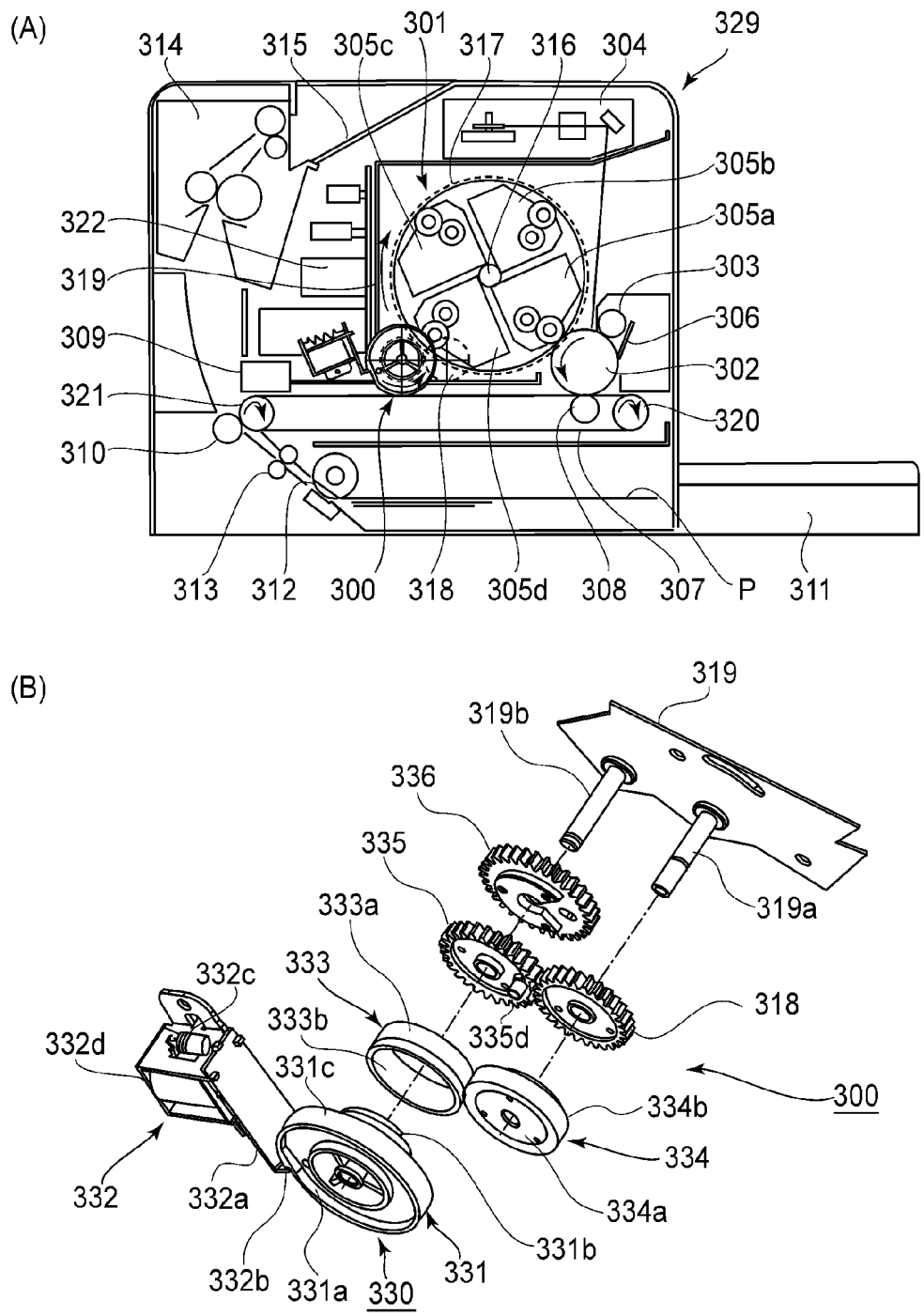
FIG. 19(A) is a sectional view of an image forming apparatus in Embodiment 5.
FIG. 19(B) is an exploded perspective view of a rotation control clutch in Embodiment 5.

FIG. 19(A) shows an image forming apparatus to which a rotation control clutch in this embodiment according to the present invention is applied. An image forming apparatus 329 does not include the plurality of developing devices disposed around the photosensitive drum as in Embodiments 3 and 4 but includes a rotary developing unit (developing rotary) 301 provided with a plurality of developing cartridges 305a, 305b, 305c and 305d.

The rotary developing unit 301 includes a rotation shaft 316 and the plurality of developing cartridges 305a, 305b, 305c and 305d which are radially disposed around the rotation shaft 316. In this constitution, one developing cartridge 305 is selectively caused to contact a photosensitive drum 302 by rotating the rotary developing unit 301 about the rotation shaft 316. In order to rotate the rotary developing unit 301, a rotation control clutch 300 according to the present invention is used.

In the image forming apparatus 329, the surface of the photosensitive drum 302 is uniformly charged by a charging roller 303 and then is irradiated with laser light from a scanner unit 304 depending on an image signal for a predetermined color, so that an electrostatic latent image is formed on the photosensitive drum 302. One developing cartridge 305 in the rotary developing unit 301 opposes and contacts the photosensitive drum 302 carrying the latent image written (formed) by the scanner unit 304, so that the latent image is developed into a toner image of a desired color. The toner image is transferred onto an intermediary transfer belt 307 rotationally driven by a belt driving roller 320 and thus primary transfer is effected. Residual toner on the photosensitive drum 302 is removed by a drum cleaner 306 and then the photosensitive drum surface is uniformly charged by the charging roller 303 again.

Further, in the case where a subsequent different color toner image is intended to be transferred, a rotational driving force from an unshown image forming apparatus driving portion is transmitted to a rotary driving gear 317 provided at an end portion of the rotary developing unit 301 via the rotation control clutch 300 and an output gear 336. Then, the rotary developing unit 301 is rotated by a predetermined angle (distance), so that cartridges 305 for different colors are successively caused to oppose the photosensitive drum 302 and then the resultant toner images are successively superposed on the intermediary transfer belt 307 to form a desired color toner image. Thereafter, the desired color toner image carried on the intermediary transfer belt 307 reaches a secondary transfer roller 310 by the rotation of the belt driving roller 320.

On the other hand, a sheet material P such as paper separated and fed from a sheet feeding portion 311 by a sheet feeding roller 312 is positionally aligned by a registration roller pair 313 and thereafter reaches the secondary transfer roller 310. The desired color toner image is transferred and carried on the sheet material P such as paper sandwiched between the secondary transfer roller 310 and the intermediary transfer belt 307 which is stretched by a stretching roller 321 and then is pressed and fusion-fixed by a fixing device 314. Thereafter, the sheet material P is discharged on an upper cover 315. Incidentally, in FIG. 19(A), a reference numeral 309 represents a belt cleaner and a reference numeral 322 represents a power source substrate.

Next, a constitution of the rotation control clutch 300 will be described.

FIG. 19(B) is a perspective view of the rotation control clutch 300 in this embodiment. In Embodiments 3 and 4, the plurality of rotation control clutches 230 is provided for driving the plurality of developing device contact-and-separation mechanisms disposed around the photosensitive drum 202 but in this embodiment (Embodiment 5), the single rotation control clutch 300 is provided for rotating the rotary developing unit 301.

Figure 20:
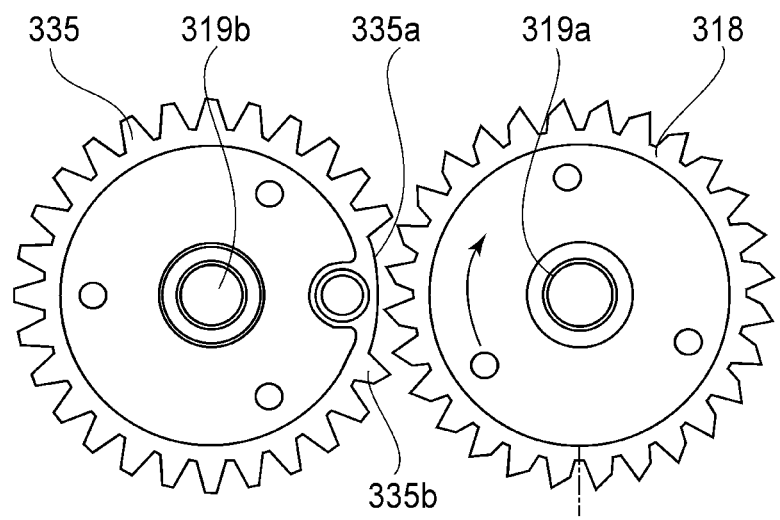
FIG. 20(A) is a schematic view showing a partly non-toothed gear and a neighborhood thereof during prevention of driving force transmission.
FIG. 20(B) is a partly enlarged front view of a control mechanism.
Figure 20:
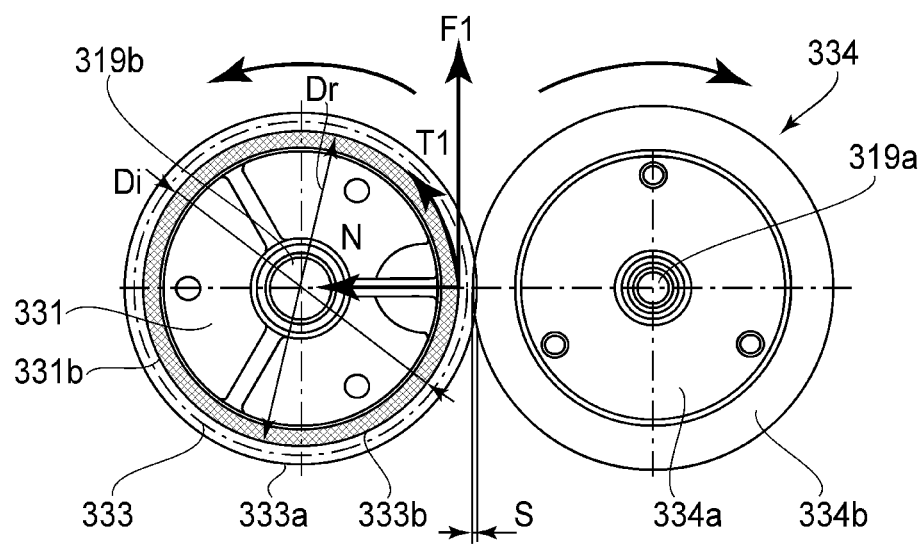

The rotation control clutch 300 is constituted by an input gear 318 and a partly non-toothed gear 335 having a toothed area 335b in which the partly non-toothed gear 335 is engageable with the input gear 318 and a non-toothed area 335a in which the partly non-toothed gear 335 is not engaged with the input gear 318 (FIG. 20(A)). The input gear 318 is rotatably supported by a supporting shaft 319a provided on a side plate 319. On the partly non-toothed gear 335, an output gear 336 for transmitting the driving force to a driving force transmission downstream side is coaxially fixed. Compared with the input gear 218 in Embodiments 3 and 4, the input gear 318 in this embodiment is smaller in size (diameter) and has the substantially same diameter as that of the partly non-toothed gear 335. Further, a control mechanism 330 for controlling an engagement state between the partly non-toothed gear 335 and the input gear 318 stops and holds the partly non-toothed gear 335 in a state, in which the non-toothed area 335a of the partly non-toothed gear 335 is located at an opposing position in which the non-toothed area 335a opposes the input gear 318, when the driving force transmission from the input gear to the partly non-toothed gear 335 is interrupted.

The control mechanism 330 controls a rotational position of the partly non-toothed gear 335 so that either one of the non-toothed area 335a and toothed area 335b of the partly non-toothed gear 335 is located at the opposing position in which the associated area opposes the input gear 318.

By locating the partly non-toothed gear 335 at the opposing position in which the non-toothed area 335a opposes the input gear 318, the driving force transmission from the input gear 318 to the partly non-toothed gear 335 is interrupted. On the other hand, by locating the toothed area 335b of the partly non-toothed gear 335 at the opposing position in which the toothed area 335b opposes the input gear 318, the driving force us transmitted from the input gear 318 to the partly non-toothed gear 335.

The control mechanism 330 includes a control ring 331 coaxially fixed on the partly non-toothed gear 335 and, a ring 333 which is rotatably and slidably contactable to the control ring 331 at a predetermined contact pressure, and a ring driving roller 334 as a ring driving means. Further, the control mechanism 330 also includes a solenoid 332 having a flapper 332a as a rotation locking mechanism for preventing the rotation of the control ring 331 by locking the control ring 331 with the flapper 332a and for permitting the rotation of the control ring 331 by releasing the locking of the control ring 331.

Constitutions of the control ring 331, the ring 333 and the solenoid 332 are basically identical to those in Embodiments 3 and 4 but in this embodiment, the output gear 336 is coaxially rotated together with the partly non-toothed gear 335. The control ring 331, the partly non-toothed gear 335 and the output gear 336 are rotatably supported by the supporting shaft 319b provided on and projected from the side plate 319 and are connected by a connecting shaft 335d provided on and projected from the partly non-toothed gear 335, thus being rotated together.

On the other hand, the ring driving roller 334 has the same constitution as that of the ring driving roller 234 in Embodiments 3 and 4 in that an elastic roller circumferential portion 334b is provided at an outer diameter portion of a roller body 334a, but is configured to have a smaller diameter than that of the ring driving roller 234 similarly as in the case of the input gear 318. The ring driving roller 334 and the input gear 318 are rotatably supported by the same supporting shaft 319b and are rotationally driven together. Pitch circles of the ring driving roller 334 and the input gear 318 have the same diameter and the ring driving roller 334 is rotated at the same speed as that of the input gear 318.

The control ring 331 includes a control ring body 331b having an outer diameter Di and includes a flange portion 331c provided with a locking latch 331a. In this embodiment, the width of the flange portion 331c is larger than that of the flange portion 231b in Embodiment 3. Further, different from Embodiment 3, the position of the flange portion 331c is located on an opposite side with respect to the partly non-toothed gear 335. In the control ring body 331b, a ring 333 having an inner diameter Dr is coaxially engaged rotatably (FIG. 9(B)).

The solenoid 332 includes, similarly as in Embodiment 3, a flapper 332a and a solenoid body 332d for driving the flapper 332a. The flapper 332a is swingably supported by the solenoid body 332d. The flapper end portion 332b which has been bent in a hook-like shape always locks the locking latch 331a of the control ring 331 by a spring force of a spring 332c. In this embodiment, correspondingly to the width of the flange portion 331c of the control ring 331, the flapper end portion 332b has a larger width than that of the flapper end portion 232b in Embodiment 3.

FIG. 20(B) shows a positional relation among the ring driving roller 334, the ring 333 and the control ring 331. In FIG. 20(B), a cross section of the control ring 331 is shown, and a center distance between the ring driving roller 334 and the control ring 331 is fixed. In order to set a desired entering amount S at a contact portion between the ring driving roller 334 and the ring 333, the center distance between the supporting shaft 319a and the supporting shaft 319b is appropriately adjusted similarly as in Embodiment 3.

Referring to FIG. 20(B), the entering amount S generates the contact pressure M toward the ring inner diameter portion 333b and the control ring body 331b. The ring 333 urged against the control ring body 331b by the contact pressure M generates, during its rotation, a tangential force F1 for causing the control ring 331 at rest to rotate in the same rotational direction.

The friction coefficient between the ring inner diameter portion 333b and the control ring body 331b is μ2, so that F1=μ2×M is satisfied. Further, when a diameter of the control ring body 331b is Di, the rotationally driving torque T1 for causing the control ring 331 to rotate together with the ring 333 in the same rotational direction can be represented by: T1=F1×(Di/2).

In FIGS. 20(A) and 20(B), the roller circumferential portion 334b, which is elastic, of the ring driving roller 334 fixed coaxially with the input gear 318 (FIG. 20(A)) rotates the ring 333 rotatably provided on the control ring body 331b while keeping the entering amount S.

At this time, a friction coefficient between contact surfaces of the ring outer diameter portion 333a and the roller circumferential portion 334b of the ring driving roller 334 is taken as μ1, and a friction coefficient between contact surfaces of a ring inner diameter portion 333b and the control ring body 331b is taken as μ2. When the friction coefficients μ1 and μ2 satisfy: μ1≧μ2, a frictional torque on the outer circumferential surface side of the ring 333 is increased, so that the ring 333 is stably rotated in synchronism with the ring driving roller 334.

Hereinafter, a method, of causing the developing cartridge for a different color to oppose the photosensitive drum 302, which is a peculiar action in this embodiment, will be described.

Referring to FIGS. 19(B) and 20(B), when the solenoid 332 is energized, the flapper 332a is magnetically attracted to the solenoid body 332d. As a result, the flapper end portion 332b is disengaged from the locking latch 331a of the control ring 331, so that rotation locking of the control ring 331 is released. The control ring 331 on which the above-described rotationally driving torque T1 of the ring 333 is exerted is rotated. Further, the partly non-toothed gear 335 fixed on the control ring 331 and a rotary output gear 336 also start to rotate at the substantially same speed as that of the input gear 318 in a direction, in which the partly non-toothed gear 335 engages with the input gear 318, against a rotation load of the rotary developing unit 301 on a clutch downstream side (FIG. 21(A)).

Figure 21:
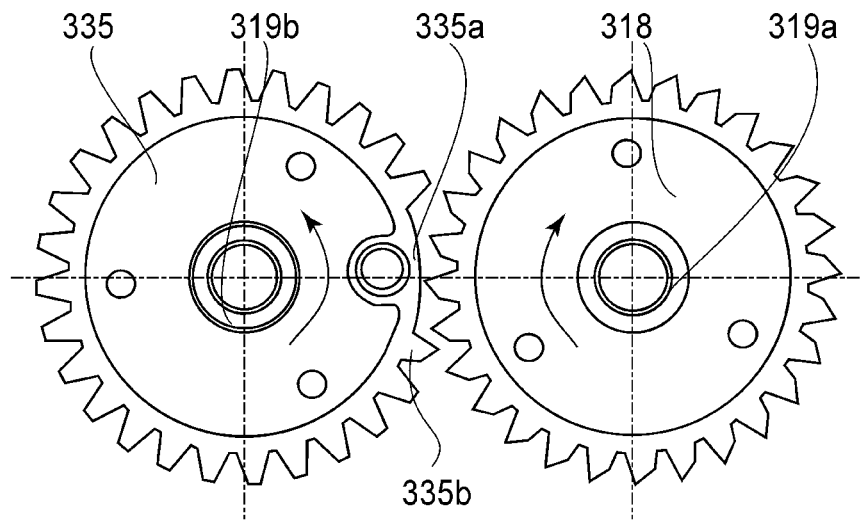
FIG. 21(A) is a schematic view showing a driving force transmission preventing state.
FIG. 21(B) is a schematic view showing a driving force transmission state.
Figure 21:
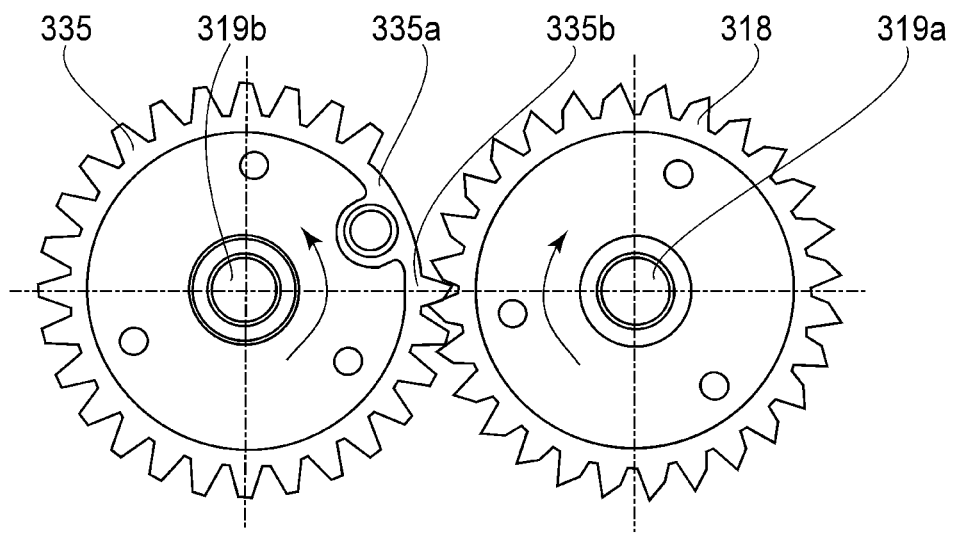

Referring to FIG. 21(B), the clutch-side partly non-toothed gear 335 and the input gear 318 are rotated at the substantially same speed and therefore a tooth of the input gear 318 engages with a first engaging tooth of the toothed area 335b of the clutch-side partly non-toothed gear 335 at the substantially same speed to establish engagement between the input gear 318 and the partly non-toothed gear 335.

Then, associated teeth of the toothed area 335b of the partly non-toothed gear 335 and those of the input gear 318 engage with each other, so that the rotational driving force supplied from the unshown image forming apparatus driving portion is transmitted from the input gear 318 to the partly non-toothed gear 335. Thus, the rotary input gear 317 is rotated by an angle corresponding to one full circumference of the rotary output gear 336 via the rotary output gear 336 rotated together with the partly non-toothed gear 335. After the predetermined rotation, a desired developing cartridge 305 in the rotary developing unit 301 reaches the opposing position in which the developing cartridge 305 opposes the photosensitive drum 302, so that the developing cartridge 305 develops the latent image on the photosensitive drum 302 into the toner image.

After the development, when the control ring 331 rotates through one full circumference, the flapper end portion 332b of the solenoid 332 which has been returned to the rotation locking position again contacts the locking latch 331a provided on the control ring 331 to rotation-lock the control ring 331. Then, the non-toothed area 335a of the partly non-toothed gear 335 opposes again the input gear 318 and the input gear 318 is idled, so that the rotational driving force supplied from the unshown image forming apparatus driving portion is (transmission-)interrupted. In this way, the control ring 331 is placed again in the state in which it awaits the rotational driving force transmission but subsequent steps are performed in the above-described manner. The toner image on the photosensitive drum 302 is transferred and carried on the intermediary transfer belt 307 and then reaches the transfer roller 310 by the rotation of the belt driving roller 320.

With respect to the transfer and fixation of the toner image on the sheet material separated and fed by the sheet feeding roller 312 and the discharge of the sheet material, these operations are performed similarly as in Embodiment 3.

Embodiment 6

Figure 22:
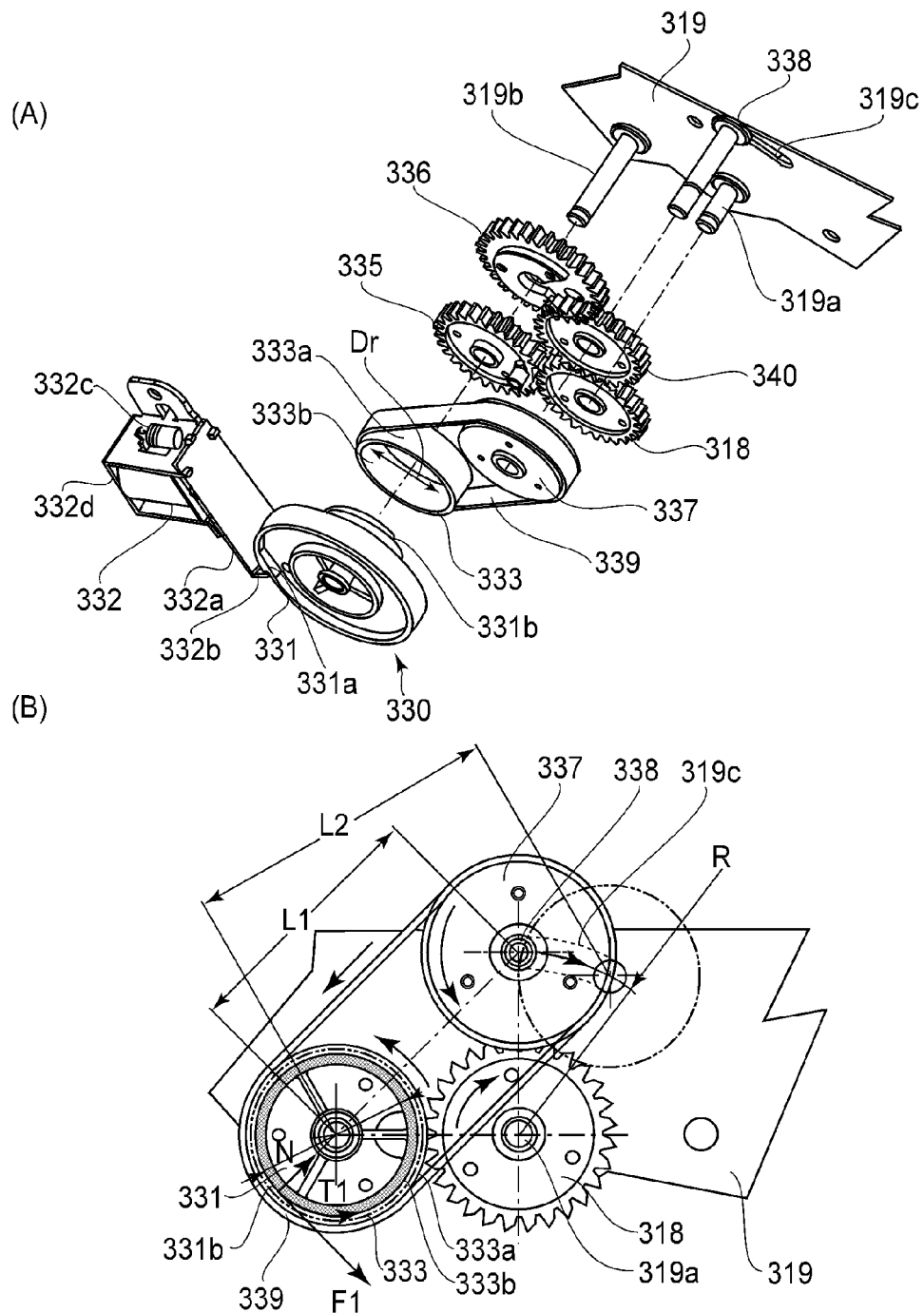
FIG. 22(A) is an exploded perspective view of a rotation control clutch in Embodiment 6.
FIG. 22(B) is a partly enlarged front view of the rotation control clutch.

FIGS. 22(A) and 22(B) show a rotation control clutch in this embodiment according to the present invention.

A basic constitution in this embodiment is identical to that in Embodiment 5 except that the rotationally driving means for driving the ring 333 is a driving belt 339 stretched around the ring 333. The printing process in the image forming apparatus 329 is similar to that in Embodiment 3.

That is, around the ring 333 and a driving pulley 337 coaxially fixed on a driving pulley gear 340, the driving belt 339 is stretched, so that the driving belt 339 rotates the ring 333 rotatably provided on the control ring body 331b at the substantially constant speed while keeping the tension.

Further, the driving pulley gear 340 is supported movably along an elongated arcuate hole 319c provided in the side plate 319 so as to be engageable with the input gear 318. That is, the elongated arcuate hole extends along a circumference of a part of a circle drawn with a radius R and with, as the center of the circle, the supporting shaft 319 for supporting the input gear 318.

FIG. 22(B) shows a locating relation among the input gear 318, the driving pulley 337, the ring 333 and the control ring 331. The driving pulley 337 and the driving pulley gear 340 (not shown in FIG. 22(B)) are movable along the elongated arcuate hole 319c having the (center) radius R, with the input gear 318 as the center of the movement, while engaging with the input gear 318. For this reason, the center distance between the driving pulley 337 and the control ring 331 can be arbitrarily set from L1 to L2 as shown in FIG. 22(B). At a position in which desired tension is obtained, a driving pulley shaft 338 is fixed.

Incidentally, the driving belt 339 is not limited to the flat belt but as the driving belt 339, it is possible to utilize various (driving force) transmission belts such as the belt having a square cross-section, the round belt and the synchronous (toothed) belt.

The driving pulley gear 340 and the driving pulley 337 and rotated at the substantially same speed in a direction opposite from the rotational direction of the input gear 318, so that the driving belt 339 stretched by the driving pulley 337 rotates the ring 333 at the substantially constant speed in the direction opposite from the rotational direction of the input gear 318 while applying the tension to the ring 333.

Embodiment 7

Figure 23:
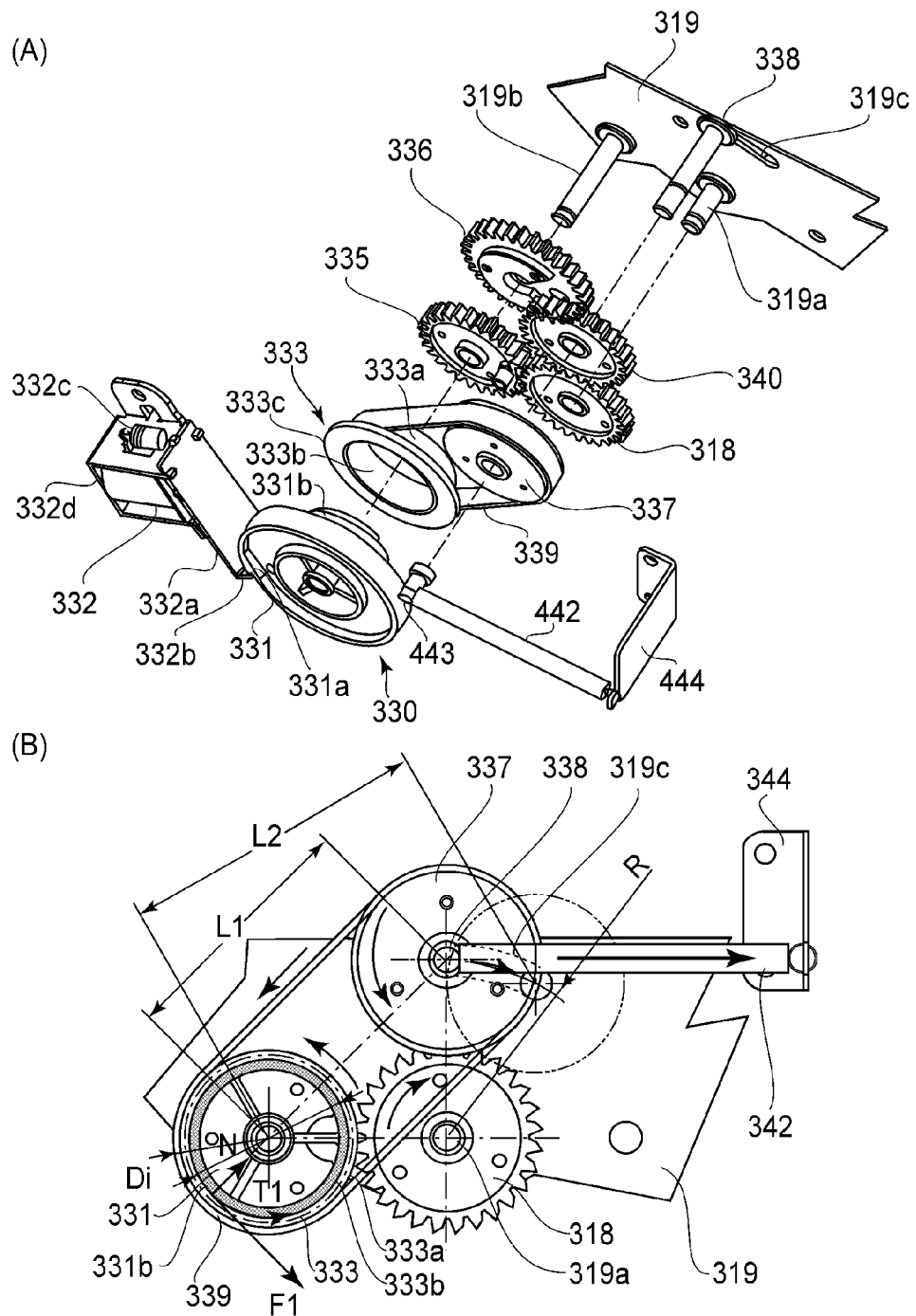
FIG. 23(A) is an exploded perspective view of a rotation control clutch in Embodiment 7.
FIG. 23(B) is a partly enlarged front view of the rotation control clutch.

FIGS. 23(A) and 23(B) show a rotation control clutch in this embodiment according to the present invention.

Also in this embodiment, similarly as in Embodiment 6, the rotationally driving means for driving the ring 333 is the driving belt 339 stretched around the ring 333. In this embodiment, as the ring 333, a flange-provided ring such that a flange 333c was provided at one (widthwise) end of the cylindrical ring 333 in order to increase the inertial moment was used. Further, as a contacting force generating means for causing the ring 333 to contact the control ring 331, a driving pulley spring 442 was provided. The flange 333c may also be provided separately from the ring 333. Further, in place of the flange 333c, a washer-like disk may also be attached to the ring 333. The flange or disk for increasing the inertial moment is also applicable to Embodiments 3 to 6 described above.

Around the ring 333 and a driving pulley 337 coaxially fixed on a driving pulley gear 340, the driving belt 339 is stretched, so that the driving belt 339 rotates the ring 333 rotatably provided on the control ring body 331b at the substantially constant speed while keeping the tension.

In this embodiment, the contacting force generating means is provided separately from the ring 333 provided with the flange 333c as the rotationally driving means. The driving pulley 337 and the driving pulley gear 340 are movable along the elongated arcuate hole 319c having the (center) radius R, with the input gear 318 as the center of the movement, while engaging with the input gear 318. For this reason, the center distance between the driving pulley 337 and the control ring 331 can be arbitrarily set from L1 to L2 as shown in FIG. 23(B). In order to obtain desired tension, the driving pulley shaft 338 which rotatably supports the driving pulley 337 and the driving pulley gear 340 is urged by the driving pulley spring 442, so that the tension is generated. The driving pulley spring 442 is latched, at its one end, on a supporting projection 443 fixed at an end of the driving pulley shaft 338 and is latched, at the other end, on a supporting metal member 444 fixed on the side plate 319.

Incidentally, in each of the above-described embodiments, the case where the rotation control clutch is applied to the drive control of the contact-and-separation mechanism of the developing device 205 in the image forming apparatus or is applied to the drive control of the rotary developing unit 301 is described but the present invention is not limited to these driving force transmission systems. For example, the drive output-side member may also be the sheet feeding roller and the present invention is applicable to various driving force transmission systems. Further, the present invention is not limited to the image forming apparatus but is also applicable to the various driving force transmission systems such as a printing machine.

Embodiment 8

Figure 4:
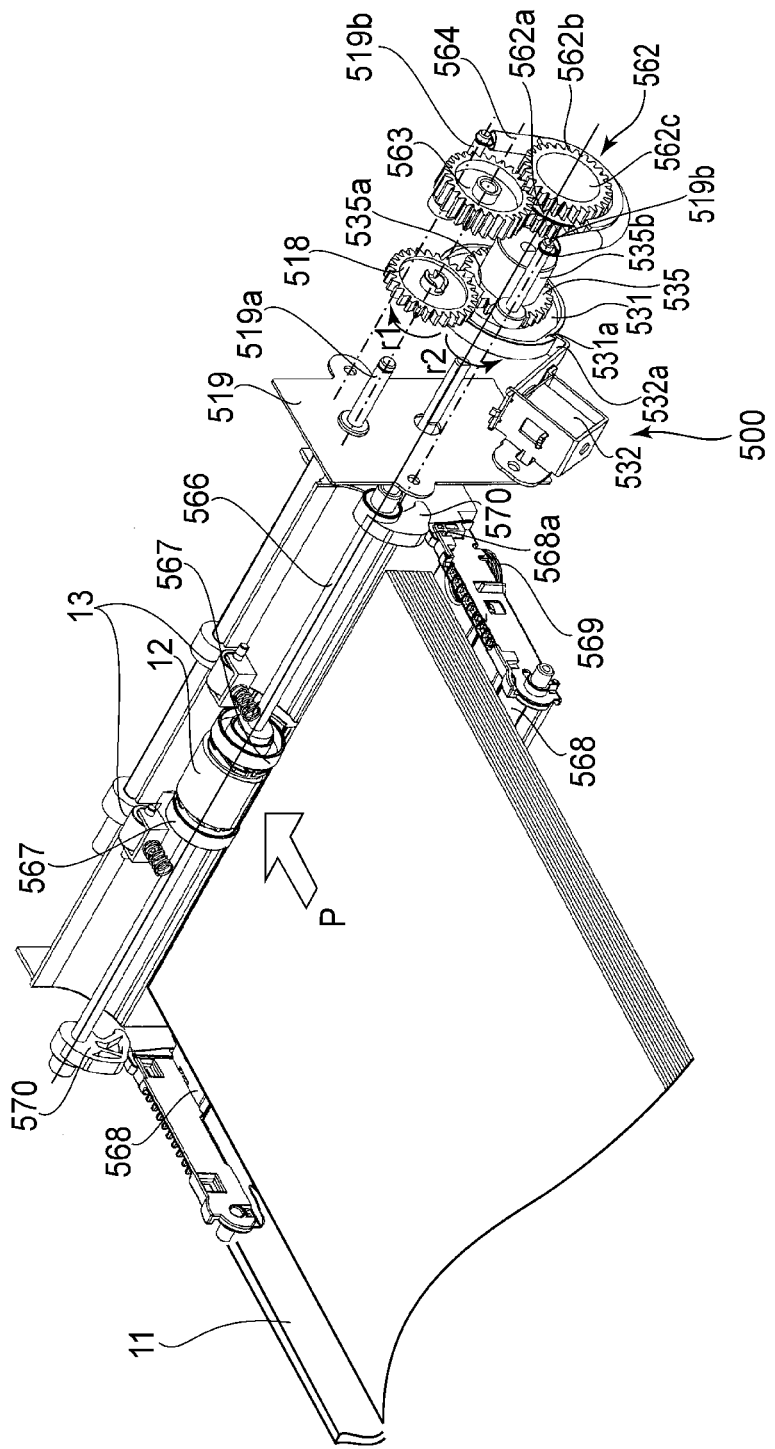
FIG. 4 is a schematic perspective view of a sheet feeding device using a drive control device in Embodiment 8.
Figure 25:
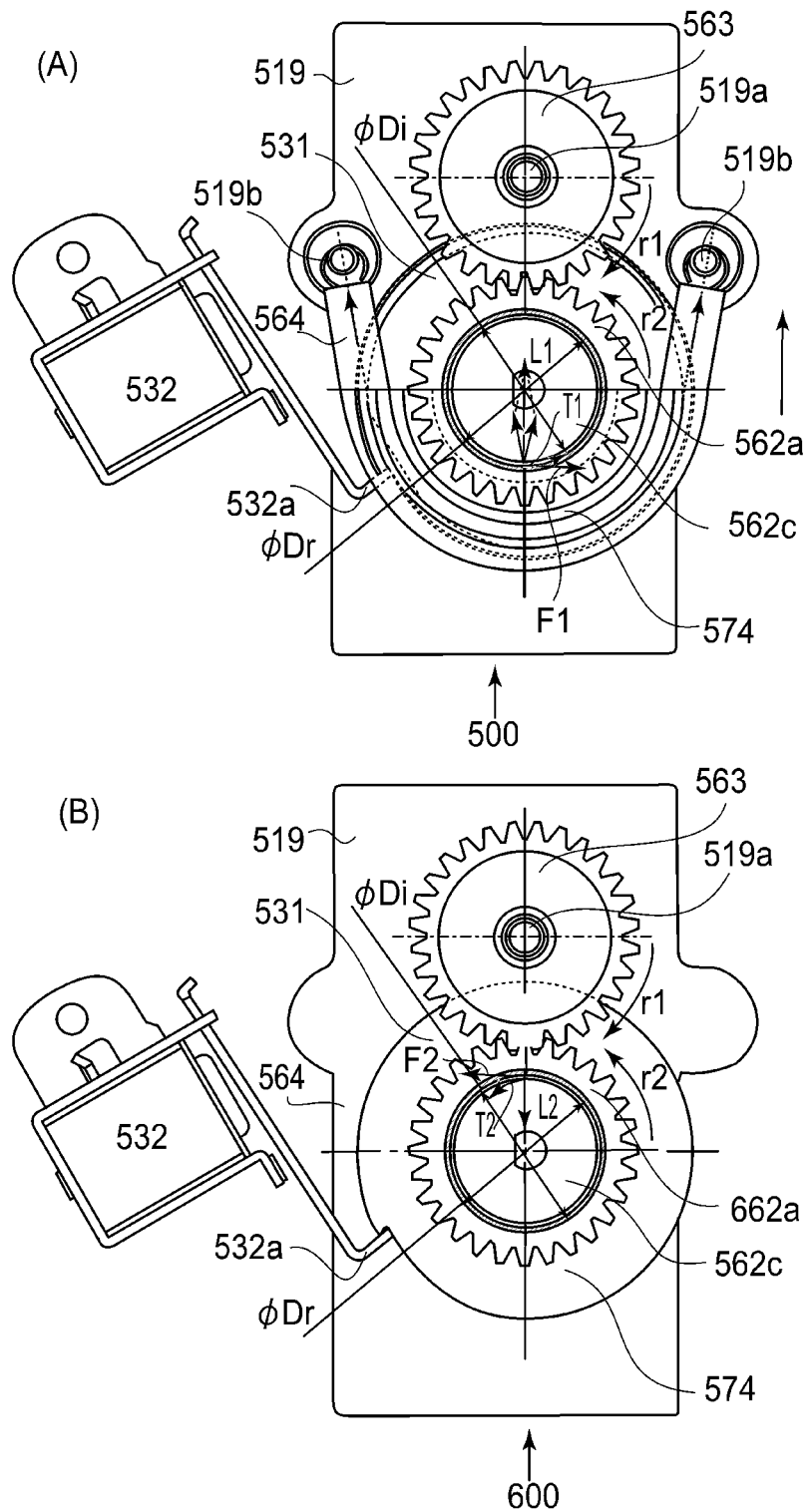
FIGS. 25(A) and 25(B) are schematic views of a drive control device in Embodiment 8.

Next, Embodiment 8 of the present invention will be described. FIG. 4 is a schematic perspective view of a sheet feeding device in this embodiment, and FIGS. 25(A) and 25(B) are schematic sectional views of a rotation control clutch for the sheet feeding device.

In this embodiment, a so-called "radial drive control device" in which an urging direction of a contact-frictional force generating means is a radial direction (circumferential direction) is used.

In this embodiment, a drive control device 500 used for rotation control of the sheet feeding roller 12, provided in the image forming apparatus 29 shown in FIG. 1, for separating and feeding the sheet material P, one by one, which is the recording medium stacked in the cassette 11 will be described.

In FIG. 4, the drive control device 500 for controlling driving force transmission to the sheet feeding roller 12 is provided at an end portion of an output shaft 566 of the sheet feeding device. The drive control device 500 includes an input gear 518 connected to an unshown driving source such as a motor and includes a partly non-toothed gear 535 provided at a position in which the partly non-toothed gear 535 is engageable with the input gear 518.

When the output shaft 566 to which the sheet feeding roller 12 is attached is stopped, a clutch control ring 531 provided integrally with the output shaft 566 is rotation-stopped by locking of a locking latch 531a by a flapper end portion 532a of a solenoid 532. On the clutch control ring 531, the partly non-toothed gear 535 which is to be rotated and stopped together with the clutch control ring 531 is provided. The partly non-toothed gear 535 includes a circumferential portion 535b having an outer diameter Di, as shown in FIG. 25(A), on which an inner circumferential portion 562c of a clutch-synchronous gear 562 having an inner diameter Dr is coaxially provided rotatably and is integrally attached to the output shaft 566 together with the sheet feeding roller 12 and a cam 570. At this time, Dr>Di is satisfied.

The input gear 518 is rotatably supported by an input gear shaft 519a on a main assembly side plate 519 so as to be engageable with the partly non-toothed gear 535. Further, on the input gear 518, a clutch input gear 563 which is the driving member is coaxially fixed integrally. The input gear 518 and the clutch input gear 563 have the same number of teeth, i.e., 28 teeth. The clutch input gear 563 has a second gear tooth at its circumferential surface.

On the other hand, the partly non-toothed gear 535 including a non-toothed area 535a and the synchronous gear 562 also have the same number of teeth, i.e., 28 teeth. The synchronous gear 562 has a first gear tooth 562a, at its circumferential surface, engageable with the second gear tooth.

That is, in this embodiment, a reduction ratio between the input gear 518 and the partly non-toothed gear 535 and a reduction ratio between the clutch input gear 563 and the synchronous gear 562 are set so as to be equal to each other.

Next, a mechanism for drive transmission and drive transmission release between the partly non-toothed gear 535 and the input gear 518 will be described.

As shown in FIG. 4 and FIG. 25(A), the clutch input gear 563 fixed on the input gear 518 rotatable in a direction indicated by an arrow r1 is also rotated in the r1 direction at the same speed as that of the input gear 518. At the same time, the synchronous gear 562 engaging with the clutch input gear 563 is rotated in a direction indicated by an arrow r2. At that time, by tension of a spring 564, an urging force L1 is generated between an inner circumferential portion 562c of the synchronous gear 562 and an outer circumferential portion 535b of the partly non-toothed gear 535. The synchronous gear 562 contacting the outer circumferential portion 535b of the partly non-toothed gear 535 by the urging force is idled, during its rotation, in a state in which a frictional force F1 which is a tangential force for causing the partly non-toothed gear 535 to rotate in the same direction as that of the synchronous gear 562 is generated.

Then, the solenoid 532 is energized and when the flapper end portion 532a of the solenoid 532 is disengaged from the locking latch 531a of the clutch control ring 531, the clutch control ring 531 starts its rotation at the same speed as that of the synchronous gear 562 by the contact-frictional force.

At this time, in this embodiment, the input gear 518 and the clutch input gear 563 are rotated together at the same speed. Further, the reduction ratio between the input gear 518 and the partly non-toothed gear 535 engaging with the input gear 518 and the reduction ratio between the clutch input gear 563 and the synchronous gear 562 engaging with the clutch input gear 563 are set so as to be equal to each other. Therefore, the input gear 518 and the partly non-toothed gear 535 are engageable with each other at the same speed. As a result, tooth contact noise between the input gear 518 and the partly non-toothed gear 535 at the time of start of the engagement can be alleviated.

First, when the flapper end portion 532a of the solenoid 532 is disengaged from the locking latch 531a of the clutch control ring 531, the input gear 518 and the partly non-toothed gear 535 engage with each other. Then, after predetermined rotation, the engagement of the input gear 518 with a toothed area 535a of the partly non-toothed gear 535 is completed, the partly non-toothed gear 535 is further rotated by the rotation-together torque T1 and a rotational force generated by the cam 570 in interrelation with an intermediate plate 568, so that the partly non-toothed gear 535 is returned to the state in which the partly non-toothed gear 535 does not engage with the input gear 518.

A mechanism for rotating the partly non-toothed gear 535 and the clutch control ring 531 by the contact-frictional force F1 will be described more specifically with reference to FIG. 25(B).

When the urging force of the spring 564 is L1, a friction coefficient between the outer circumferential portion 535b of the partly non-toothed gear 535 and the inner circumferential portion 562c of the synchronous gear 562 is μ, and a load torque exerted on the output shaft 566 is T, the frictional force F1 between the partly non-toothed gear 535 and the synchronous gear 562 is represented by: F1=μL1.

Therefore, the rotation-together torque T1 which is a torque for rotating the synchronous gear 562 and the partly non-toothed gear 535 together can be represented by:

$$T1 = F1 \times (Di/2) = \mu L1 \times (Di/2).$$

When the rotation-together torque T1 and the load torque T exerted on the output sheet 566 satisfy the relationship: T1>T, the rotation control clutch 530 can stably transmit the driving force.

Further, in this embodiment, the teeth of the synchronous gear 562 and the clutch input gear 563 are prevented from contact each other at their one end side due to out of parallelism between the gears 562 and 563. For this purpose, the teeth of the synchronous gear 562 are divided into the tooth 562a (the first gear tooth) and a tooth 562b so that the spring 64 can generate the urging force at the substantially center of a facewidth of the synchronous gear 562. Further, between the tooth 562a and the tooth 562b, a spring guide 574 is disposed, and the spring 564 which is an urging member is extended along the spring guide 574.

For that reason, the clutch input gear 563 and the synchronous gear 562 are constituted so that the gears 563 and 562 can be rotated together while the tooth 562b has slight play with respect to the tooth 562a so as not to cause interference gear the clutch input gear 563 and each of the teeth 562a and 562b of the synchronous gear 562.

However, in order to prevent the associated teeth of the synchronism gear 562 and the clutch input gear 563 from contact each other at their one end side, the spring 564 is provided at both ends (two portions) with respect to a facewidth direction. When such a constitution that the synchronous gear 562 is disposed at the substantially central portion with respect to the facewidth direction can be realized, the synchronous gear 562 may also be an integral gear with no divided teeth 562a and 562b.

Even when a constitution in which the teeth of the synchronous gear 562 are divided into the tooth 562a and the tooth 562a similarly as in this embodiment is employed, there is no problem if the constitution satisfy the following condition. That is, a phase difference between the two teeth 562a and 562b of the synchronous gear 562 is made a value which is closer and closer to zero. Further, there is also no problem when a constitution in which the teeth of the clutch input gear 563 and each of the teeth 562a and 562b of the synchronous gear 562 are prevented from causing the engaging interference therebetween by backlash of the engagement between the clutch gear 563 and the synchronous gear 562 is employed.

Further, in this embodiment, the contact-frictional force F was generated between the tooth 562a of the synchronous gear 562 and the inner circumferential portion 562c by the urging force of the spring 564. However, as shown in FIG. 25(B), a tooth 662a of the synchronous gear 562 may also be formed of metal to generate a contact-frictional force F2 and a rotation-together force T2 between the tooth 662a and the inner circumferential portion 562c by its own weight. As a result, the spring 564 can be omitted.

According to the present invention, it is possible to make the rotational speeds of the input gear and the partly non-toothed gear equal to each other, so that impact noise by tooth contact at the time when the input gear and the partly non-toothed gear engage with each other.

While the invention has been described with reference to the structures disclosed herein, it is not confined to the details set forth and this application is intended to cover such modifications or changes as may come within the purpose of the improvements or the scope of the following claims.

This application claims priority from Japanese Patent Applications Nos. 178080/2009 filed Jul. 30, 2009, 232728/2009 filed Oct. 6, 2009, and 156010/2010 filed Jul. 8, 2010 which are hereby incorporated by reference.

What is claimed is:

1. A driving device to be used in an image forming apparatus, comprising:
an input gear;
a partly non-toothed gear having a toothed portion engageable with said input gear and having a non-toothed portion;
a holding member capable of placing said partly non-toothed gear in a holding state in which the non-toothed portion opposes said input gear and said partly non-toothed gear is not engaged with said input gear and capable of placing said partly non-toothed gear in a released state in which the holding state is released;
a cylindrical member rotatable by receiving a rotational force;
a driving member for applying the rotational force to said cylindrical member; and
an entering portion which is rotatable together with said partly non-toothed gear and which is capable of moving inside of said cylindrical member and capable of receiving the rotational force from said cylindrical member by a frictional force between said entering portion and said cylindrical member.

2. A device according to claim 1, wherein said cylindrical member includes a first magnet at its circumferential surface, and said driving member is spaced from said cylindrical member with a predetermined gap and includes a second magnet at its circumferential surface.

3. A device according to claim 2, wherein the first magnet has an N pole and an S pole disposed alternately along a circumferential direction of the circumferential surface of said cylindrical member.

4. A device according to claim 3, wherein the second magnet has the N pole and the S pole disposed alternately along a circumferential direction of the circumferential surface of said driving member.

5. A device according to claim 2, wherein an N pole and an S pole of the first and second magnets have a symmetrical shape with respect to a widthwise center line of each of the first magnet and the second magnet and have a bent portion along the center line of each of the first magnet and the second magnet.

6. A device according to claim 1, wherein said driving member is an elastic roller and applies an urging force to said cylindrical member in a direction crossing an axis of said cylindrical member so that said cylindrical member is urged against said entering portion.

7. A device according to claim 1, wherein said driving member includes a pulley and a driving belt stretched around said cylindrical member, and the driving belt applies an urging force to said cylindrical member in a direction crossing an axis of said cylindrical member so that said cylindrical member is urged against said entering portion.

8. A device according to claim 1, wherein said cylindrical member causes the frictional force by its own weight.

9. A device according to claim 1, wherein said cylindrical member is provided at its circumferential surface with a first gear tooth, and said driving member is provided at its circumferential surface with a second gear tooth engageable with the first gear tooth.

10. A device according to claim 9, further comprising an urging member for applying an urging force to said cylindrical member in a direction crossing an axis of said cylindrical member.

11. An image forming apparatus comprising:
a photosensitive member;
a plurality of developing devices each for developing a latent image formed on said photosensitive member; and
a developing rotary for holding said plurality of developing devices mountably and demountably, said developing rotary being rotatable to move each of said plurality of developing devices to a developing position at which the latent image is to be developed,
wherein to said developing rotary, a rotational driving force is transmitted by a driving device according to claim 1.

12. An image forming apparatus for forming an image on a recording material, comprising:
a cassette in which a plurality of recording materials is stacked; and
a feeding roller for separating and feeding the recording material from the plurality of recording materials stacked in said cassette,
wherein to said feeding roller, a rotational driving force is transmitted by a driving device according to claim 1.

* * * * *